United States Patent
Nath et al.

(10) Patent No.: US 10,410,252 B2
(45) Date of Patent: Sep. 10, 2019

(54) ENERGY-EFFICIENT CONTENT SERVING

(71) Applicant: Microsoft Technology Licensing, LLC, Redmond, WA (US)

(72) Inventors: Suman Kumar Nath, Redmond, WA (US); Oriana Riva, Redmond, WA (US); Douglas Christopher Burger, Bellevue, WA (US); Prashanth Mohan, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 327 days.

(21) Appl. No.: 15/379,452

(22) Filed: Dec. 14, 2016

(65) Prior Publication Data

US 2017/0098248 A1 Apr. 6, 2017

Related U.S. Application Data

(62) Division of application No. 13/831,845, filed on Mar. 15, 2013, now Pat. No. 9,558,508.

(51) Int. Cl.
*G06Q 30/02* (2012.01)
*H04L 29/06* (2006.01)

(52) U.S. Cl.
CPC ..... *G06Q 30/0267* (2013.01); *G06Q 30/0251* (2013.01); *G06Q 30/0254* (2013.01); *G06Q 30/0255* (2013.01); *G06Q 30/0272* (2013.01); *H04L 67/42* (2013.01)

(58) Field of Classification Search
CPC ........................................ G06Q 30/0207–0277
See application file for complete search history.

(56) References Cited

U.S. PATENT DOCUMENTS

| | | | |
|---|---|---|---|
| 5,754,938 A * | 5/1998 | Herz .................... | G06Q 20/383 |
| | | | 348/E7.056 |
| 8,423,408 B1 | 4/2013 | Barnes et al. | |
| 9,661,374 B1* | 5/2017 | Erdmann .......... | H04N 21/4331 |
| 2004/0215717 A1* | 10/2004 | Seifert ................ | H04L 67/2804 |
| | | | 709/203 |
| 2006/0277271 A1 | 12/2006 | Morse et al. | |
| 2008/0004954 A1 | 1/2008 | Horvitz | |

(Continued)

FOREIGN PATENT DOCUMENTS

| CN | 101379476 A | 3/2009 |
|---|---|---|
| CN | 101479758 A | 7/2009 |

OTHER PUBLICATIONS

"Office Action Issued in European Patent Application No. 14713358. 1", dated Sep. 17, 2018, 6 Pages.

(Continued)

*Primary Examiner* — David J Stoltenberg
(74) *Attorney, Agent, or Firm* — Medley, Behrens & Lewis, LLC

(57) ABSTRACT

Various technologies described herein pertain to allocating content units to client devices. Content units can be requested from an exchange by a server. The content units can be received by the server from the exchange, where the content units each has a corresponding deadline for expiration. Further, an indication of a penalty can be transmitted to the exchange if one of the content units is not displayed by one or more client devices upon expiration of the corresponding deadline.

20 Claims, 13 Drawing Sheets

(56) References Cited

U.S. PATENT DOCUMENTS

| | | | |
|---|---|---|---|
| 2008/0215437 A1* | 9/2008 | Levy | G06Q 30/02 705/14.54 |
| 2008/0242280 A1 | 10/2008 | Shapiro et al. | |
| 2008/0248779 A1 | 10/2008 | Tsui et al. | |
| 2009/0006180 A1 | 1/2009 | Hameen-Anttila | |
| 2009/0048911 A1 | 2/2009 | Shenfield et al. | |
| 2009/0048912 A1 | 2/2009 | Shenfield et al. | |
| 2009/0048913 A1 | 2/2009 | Shenfield et al. | |
| 2009/0049090 A1 | 2/2009 | Shenfield et al. | |
| 2009/0248858 A1 | 10/2009 | Sivasubramanian et al. | |
| 2009/0298480 A1 | 12/2009 | Khambete et al. | |
| 2009/0327076 A1 | 12/2009 | Sinyagin et al. | |
| 2010/0036737 A1 | 2/2010 | Shenfield et al. | |
| 2010/0050201 A1 | 2/2010 | Kubota et al. | |
| 2010/0125491 A1* | 5/2010 | Elliott | G06Q 30/02 705/14.4 |
| 2010/0262455 A1* | 10/2010 | Karlsson | G06Q 30/02 705/14.45 |
| 2011/0035259 A1* | 2/2011 | Das | G06Q 30/02 705/14.41 |
| 2011/0167486 A1 | 7/2011 | Ayloo et al. | |
| 2011/0213800 A1* | 9/2011 | Saros | G06Q 30/02 707/769 |
| 2012/0023226 A1 | 1/2012 | Petersen et al. | |
| 2012/0030275 A1* | 2/2012 | Boller | G06F 16/9574 709/203 |
| 2012/0271714 A1* | 10/2012 | Farahat | G06Q 30/0241 705/14.53 |
| 2012/0278432 A1 | 11/2012 | Luna | |
| 2013/0060631 A1 | 3/2013 | Corson et al. | |
| 2013/0110636 A1* | 5/2013 | Bott | G06F 16/9574 705/14.64 |
| 2013/0110637 A1* | 5/2013 | Bott | G06F 16/9574 705/14.64 |
| 2013/0110643 A1* | 5/2013 | Goyal | G06Q 30/02 705/14.68 |
| 2013/0124339 A1 | 5/2013 | Park | |
| 2013/0166395 A1* | 6/2013 | Vassilvitskii | G06Q 30/0244 705/14.73 |
| 2013/0232008 A1 | 9/2013 | Macaluso | |
| 2013/0246164 A1* | 9/2013 | Khanna | G06Q 30/0267 705/14.45 |
| 2013/0267254 A1* | 10/2013 | Zhang | H04W 4/02 455/456.3 |
| 2013/0325607 A1* | 12/2013 | Delug | G06Q 30/0269 705/14.53 |
| 2014/0279026 A1 | 9/2014 | Nath et al. | |
| 2016/0063577 A1* | 3/2016 | Yellin | G06Q 30/0277 705/14.73 |

OTHER PUBLICATIONS

"Non-Final Office Action Issued in U.S. Appl. No. 15/379,438", dated Nov. 1, 2018, 8 Pages.

"First Office Action and Search Report Issued in Chinese Patent Application No. 201480016124.7", dated Feb. 2, 2018, 10 Pages.

Vallina-Rodriguez, et al., "Breaking for Commercials: Characterizing Mobile Advertising", Retrieved at <<http://www.cl.cam.ac.uk/~nv240/papers/AdTraffic_IMC2012.pdf>>, In the proceedings of the 2012 ACM conference on Internet measurement conference, Nov. 14, 2012, pp. 1-14.

Morgan, Gareth, "Microsoft devises faster, more power-efficient mobile browsing system", Retrieved at <<http://www.v3.co.uk/v3-uk/news/2157115/microsoft-devises-faster-power-efficient-mobile-browsing>>, Mar. 5, 2012, pp. 1-2.

Higgins, et al., "Informed Mobile Prefetching", Retrieved at <<http://notrump.eecs.umich.edu/papers/mobisys12.pdf>>, In the Proceedings of the 10th International Conference on Mobile Systems, Applications, and Services, Jun. 25, 2012, pp. 1-14.

Kangas, Kimmo, "Cost Optimisation of Mobile Advertising Client Data Transfer", Retrieved at <<http://www.doria.fi/bitstream/handle/10024/45515/nbnfi-fe200905151460.pdf?sequence=3>>, Retrieved Date: Dec. 28, 2012, pp. 1-74.

Armstrong, Nicholas D. R., "Just-In-Time Push Prefetching: Accelerating the Mobile Web", Retrieved at <<http://uwspace.uwaterloo.ca/bitstream/10012/6256/1/Armstrong_Nicholas.pdf>>, In Theses and Dissertations, Sep. 19, 2011, pp. 1-103.

"Flurry", Retrieved at <<http://www.flurry.com/>>, Retrieved Date: Dec. 27, 2012, pp. 1-2.

Agarwal, et al., "Wireless Wakeups Revisited: Energy Management for VoIP over Wi-Fi Smartphones", Retrieved at <<http://research.microsoft.com/en-us/um/people/alecw/mobisys-2007.pdf>>, In Proceedings of the 5th International Conference on Mobile Systems, Applications and Services, Jun. 11, 2007, pp. 1-13.

"AppBrain", Retrieved at <<http://www.appbrain.com/stats/android-app-downloads>>, Retrieved Date: Dec. 27, 2012, pp. 1-2.

Armstrong, et al., "Efficient and Transparent Dynamic Content Updates for Mobile Clients", Retrieved at <<http://sysweb.cs.toronto.edu/publication_files/39/trevor.pdf>>, In Proceedings of the 4th International Conference on Mobile Systems, Jun. 19, 2006, pp. 1-13.

Backes, et al., "ObliviAd: Provably Secure and Practical Online Behavioral Advertising", Retrieved at <<http://ieeexplore.ieee.org/stamp/stamp.jsp?tp=&arnumber=6234417>>, In IEEE Symposium on Security and Privacy, May 20, 2012, pp. 1-15.

Balasubramanian, et al., "Energy Consumption in Mobile Phones: A Measurement Study and Implications for Network Applications", Retrieved at <<http://ciir-publications.cs.umass.edu/getpdf.php?id=904>>, In Proceedings of ACM SIGCOMM Conference on Internet Measurement Conference, Nov. 4, 2009, pp. 1-14.

Chuah, et al., "Impacts of Inactivity Timer Values on UMTS System Capacity", Retrieved at <<http://ieeexplore.ieee.org/stamp/stamp.jsp?arnumber=00993390>>, In Proceedings of the IEEE Wireless Communications and Networking Conference, vol. 2, Mar. 2002, pp. 1-7.

"Google AdMob Ads SDK", Retrieved at<<https://developers.google.com/mobile-ads-sdk/docs/admob/intermediate>>, Retrieved Date: Dec. 27, 2012, pp. 1-4.

Guha, et al., "Privad: Practical Privacy in Online Advertising", Retrieved at <<http://static.usenix.org/event/nsdi11/tech/full_papers/Guha.pdf>>, In Proceedings of the 8th USENIX Conference on Networked Systems Design and Implementation, Mar. 2011, pp. 1-14.

"International Technology Roadmap for Semiconductors", Retrieved at <<http://maltiel-consulting.com/ITRS-International_Technology_Roadmap_Semiconductor_Executive_Summary_2009_maltiel.pdf>>, In ITRS Working Group Technical Report, Retrieved Date: Dec. 28, 2012, pp. 1-94.

Jiang, et al., "Web Prefetching in a Mobile Environment", Retrieved at <<http://www.lk.cs.ucla.edu/data/files/Jiang/Web%20Prefetching%20in%20a%20Mobile%20Environment.pdf>>, In IEEE Personal Communications, Oct. 1998, pp. 1-10.

Khalil, et al., "Integrating Recommendation Models for Improved Web Page Prediction Accuracy", Retrieved at <<http://eprints.usq.edu.au/5903/1/Khalil_Li_Wang_ACSC2008_PV.pdf>>, In Proceedings of the Thirty-First Australasian Conference on Computer Science, Jan. 22, 2008, pp. 1-10.

Khan, et al., "Mitigating the True Cost of Advertisement-Supported 'Free' Mobile Applications", Retrieved at <<http://www.hotmobile.org/2012/papers/HotMobile12-final29.pdf>>, In Proceedings of the Twelfth Workshop on Mobile Computing Systems & Applications, Feb. 27, 2012, pp. 1-6.

Komninos, et al., "A Calendar Based Internet Content Pre-Caching Agent for Small Computing Devices", Retrieved at <<http://130.203.133.150/viewdoc/download;jsessionid=8C39FE907FA4AC8F59877FF503FA2FCB?doi=10.1.1.66.4946&rep=rep1&type=pdf>>, In Journal of Personal and Ubiquitous Computing, vol. 12, Issue 7, Oct. 2008, pp. 1-15.

Koukoumidis, et al., "Pocket Cloudlets", Retrieved at <<http://research.microsoft.com/pubs/147288/asplos210-koukoumidis.pdf>>, In Proceedings of the 16th International Conference on Architectural Support for Programming Languages and Operating Systems, Mar. 5, 2011, pp. 1-13.

(56) References Cited

OTHER PUBLICATIONS

Leontiadis, et al., "Don't Kill my Ads! Balancing Privacy in an Ad-Supported Mobile Application Market", Retrieved at <<http://www.cl.cam.ac.uk/~i1235/HotMobile12_Leontiadis.pdf>>, In Proceedings of the Twelfth Workshop on Mobile Computing Systems & Applications, Feb. 28, 2012, pp. 1-6.

"LiveLab Traces", Retrieved at <<http://livelab.recg.rice.edu/traces.html>>, Retrieved Date: Dec. 27, 2012, pp. 1-5.

Lymberopoulos, et al., "PocketWeb: Instant Web Browsing for Mobile Devices", Retrieved at <<http://research.microsoft.com/pubs/157002/aspl254-Lymberopoulos.pdf>>, In Proceedings of the Seventeenth International Conference on Architectural Support for Programming Languages and Operating Systems, Mar. 3, 2012, pp. 1-12.

Markatos, et al., "A Top-10 Approach to Prefetching the Web", Retrieved at <<http://dcs.ics.forth.gr/Activities/Publications/INET98_prefetch.html>>, In INET—Internet Society Conference, Jul. 21, 1998, pp. 1-11.

"Common Compiler Infrastructure", Retrieved at <<http://research.microsoft.com/en-us/projects/cci/>>, In Microsoft Research, Retrieved Date: Dec. 27, 2012, p. 1.

Mittal, et al., "Empowering Developers to Estimate App Energy Consumption", Retrieved at <<http://research.microsoft.com/pubs/166288/WattsonMobicom12.pdf>>, In Proceedings of the 18th Annual International Conference on Mobile Computing and Networking, Aug. 22, 2012, pp. 1-11.

Nanopoulos, et al., "A Data Mining Algorithm for Generalized Web Prefetching", Retrieved at <<http://ieeexplore.ieee.org/stamp/stamp.jsp?arnumber=01232270>>, In IEEE Transactions on Knowledge and Data Engineering, vol. 15, Issue 5, Sep. 2003, pp. 1-15.

Padmanabhan, et al., "Using Predictive Prefetching to Improve World Wide Web Latency", Retrieved at <<http://maya.cs.depaul.edu/~mobasher/research/bib/bib-papers/PM96.pdf>>, In Newsletter of ACM SIGCOMM Computer Communication Review, vol. 26, Issue 3, Jul. 1996, pp. 1-15.

Pathak, et al., "Where is the Energy Spent Inside My App? Fine Grained Energy Accounting on Smartphones with Eprof", Retrieved at <<http://research.microsoft.com/en-us/people/mzh/eurosys-2012.pdf>>, In Proceedings of the 7th ACM European Conference on Computer Systems, Apr. 10, 2012, pp. 1-14.

Pering, et al., "CoolSpots: Reducing the Power Consumption of Wireless Mobile Devices with Multiple Radio Interfaces", Retrieved at <<http://static.usenix.org/events/mobisys06/full_papers/p220-pering.pdf>>, In Proceedings of the 4th International Conference on Mobile Systems, Applications and Services, Jun. 19, 2006, pp. 1-13.

Shepard, et al., "LiveLab: Measuring Wireless Networks and Smartphone Users in the Field", Retrieved at <<http://ahmad.rahmati.com/papers/10.HotMetrics.LiveLab.pdf>>, In Newsletter of ACM SIGMETRICS Performance Evaluation Review, vol. 38, Issue 3, Dec. 2010, pp. 1-5.

Smith, et al., "Yield Management at American Airlines", Retrieved at <<http://morten.ifi.uio.no/wp-content/uploads/2011/04/Smith_et_al_yield_mgmnt.pdf>>, In Interfaces, vol. 22, Issue 1, Jan. 1992, pp. 1-24.

Tan, et al., "An Empirical Study on the Capacity and Performance of 3G Networks", Retrieved at <<http://www.inf.ed.ac.uk/teaching/courses/cn/papers/tan-tmc08.pdf>>, In Journal of IEEE Transactions on Mobile Computing, vol. 7, Issue 6, Jun. 2008, pp. 1-14.

Toubiana, et al., "Adnostic: Privacy Preserving Targeted Advertising", Retrieved at <<http://crypto.stanford.edu/adnostic/adnostic.pdf>>, In Proceedings of the Network and Distributed System Security Symposium, Feb. 28, 2010, pp. 1-23.

Urgaonkar, et al., "Resource Overbooking and Application Profiling in Shared Hosting Platforms", Retrieved at <<http://lass.cs.umass.edu/papers/pdf/TR02-21.pdf>>, In Proceedings of the 5th Symposium on Operating Systems Design and Implementation, Dec. 9, 2002, pp. 1-15.

Yan, et al., "Fast App Launching for Mobile Devices Using Predictive User Context", Retrieved at <<http://research.microsoft.com/pubs/163201/FalconMobisys12.pdf>>, In the 10th International Conference on Mobile Systems, Applications, and Services, Jun. 25, 2012, pp. 1-14.

Yeh, et al., "Comparative Analysis of Energy-Saving Techniques in 3GPP and 3GPP2 Systems", Retrieved at <<http://ieeexplore.ieee.org/stamp/stamp.jsp?arnumber=04490170>>, In IEEE Transactions on Vehicular Technology, vol. 58, Issue 1, Jan. 2009, pp. 1-17.

Yin, et al., "Adaptive Power-Aware Prefetch in Wireless Networks", Retrieved at <<http://ieeexplore.ieee.org/stamp/stamp.jsp?tp=&arnumber=1343900>>, In IEEE Transactions on Wireless Communications, vol. 3, Issue 5, Sep. 2004, pp. 1-11.

"Supplementary European Search Report Received for European Patent Application No. 14713358.1", dated Feb. 4, 2016, 5 Pages.

"Response to Official Communication Received for European Patent Application No. 14713358.1", dated Aug. 11, 2016, 2 Pages.

"International Search Report & Written Opinion for PCT Patent Application No. PCT/US2014/023841", dated Sep. 12, 2014, Filed Date: Mar. 12, 2014, 10 Pages.

"Non-Final Office Action for U.S. Appl. No. 13/831,845", dated Jan. 13, 2016, 34 pages.

"Response to the Non-Final Office Action for U.S. Appl. No. 13/831,845", Filed Date: Jun. 13, 2016, 29 pages.

"Notice of Allowance and Fees Due for U.S. Appl. No. 13/831,845", dated Sep. 15, 2016, 12 pages.

"Oral Hearing Issued in European Patent Application No. 14713358.1", dated May 10, 2019, 9 Pages.

* cited by examiner

ENERGY-EFFICIENT CONTENT SERVING

CROSS-REFERENCE TO RELATED APPLICATION

This application is a divisional application of U.S. patent application Ser. No. 13/831,845, filed on Mar. 15, 2013, and entitled "ENERGY-EFFICIENT MOBILE ADVERTISING", the entirety of which is incorporated herein by reference.

BACKGROUND

Mobile application marketplaces include many free applications that typically rely on advertising as a source of revenue. Accordingly, many consumers are drawn to the free mobile applications as opposed to paid applications in mobile application marketplaces. For instance, targeted advertisements can be displayed during execution of an application by a mobile client, which can provide a revenue stream.

While use of in-application advertising has enabled proliferation of free applications, fetching and displaying advertisements in an application can contribute to energy consumption of the application. For instance, downloading an advertisement can take a few seconds; however, after completion of downloading of the advertisement, a network radio can remain in the transmission state for an extra period of time, referred to as a tail time. Depending on the network operator, the tail time can be 10 seconds, 17 seconds, or the like. The tail time can alleviate a delay incurred when moving from an idle state to a high-power transmission state, but can increase energy cost, which can be referred to as tail energy. The foregoing can cause a significant energy overhead associated with providing advertisements during execution of applications with a mobile client.

Many conventional techniques attempt to reduce the energy consumption associated with downloading advertisements by reducing the tail time; yet, such solutions would have to be implemented by a network operator, and thus, may not be deployable. Another traditional technique attempts to aggregate traffic. For instance, traffic generated for communication of an advertisement can be aggregated with traffic associated with the application. However, functionality of an ad network may be detrimentally impacted due to delays associated with receipt of the advertisement. Thus, aggregation of traffic may not be compatible with some types of applications executed on a mobile client.

SUMMARY

Described herein are various technologies that pertain to allocating content units to client devices. According to various embodiments, content units can be requested from an exchange by a server. The content units can be received by the server from the exchange, where the content units each has a corresponding deadline for expiration. Further, an indication of a penalty can be transmitted to the exchange if one of the content units is not displayed by one or more client devices upon expiration of the corresponding deadline.

In accordance with various embodiments, a system that allocates content units to client devices can include a pending queue. The pending queue can include pending content units that have been collected from a differing system and have yet to be displayed by one or more of the client devices. The pending content units in the pending queue each has a corresponding deadline for expiration. The system can request content units from the differing system, and can receive the content units from the differing system. Moreover, the system can store the content units in the pending queue as part of the pending content units. Further, the system can transmit an indication of a penalty to the differing system if one of the pending content units is not displayed by one or more of the client devices upon expiration of the corresponding deadline.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
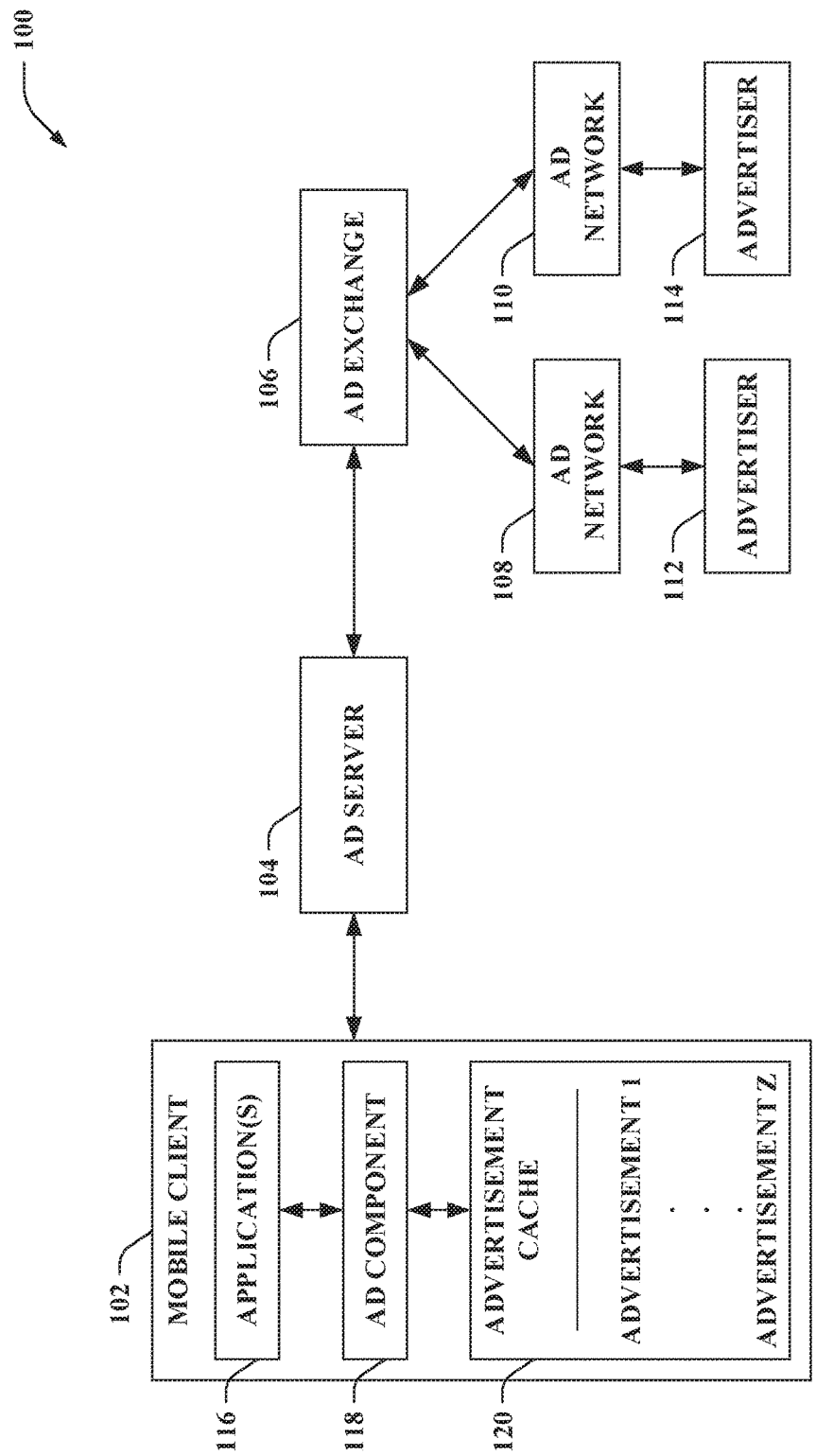
FIG. 1 illustrates a functional block diagram of an exemplary system that delivers prefetched advertisements to a mobile client.

Various technologies pertaining to prefetching advertisements for mobile advertising are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Supporting prefetching of advertisements in bulk by mobile clients such as phones, tablets, etc. can increase battery lifetime of such mobile clients. Conventional ad distribution models can be energy-inefficient because a mobile application that serves advertisements can be invoked each time an advertisement is served (e.g., advertisements can be downloaded and periodically refreshed during execution of the applications). While downloading of an advertisement can take a limited amount of time, a network radio can remain in the transmission state for an extended period of time (referred to as a tail time) upon completing the download of the advertisement. As a result, a tail energy consumed during the idle time can lead to increased communication costs associated with serving advertisements in conventional approaches. In contrast, by prefetching advertisements in bulk, a radio of a mobile client can be activated less often and the energy tail problem can be reduced.

Prefetching of advertisements can be at odds with a real-time nature of conventional advertising systems where advertisements are sold through real-time auctions each time a mobile client can display an advertisement. Thus, as provided herein, an application usage model can predict how many advertisement slots are likely to be available in an upcoming prediction time period. Based upon this estimate (which may be unreliable), an ad server can make client advertisement slots available in ad exchange auctions even before advertisements can be displayed. In order to display the advertisements within corresponding deadlines, the advertisements can be probabilistically replicated across mobile clients based on an overbooking model. The overbooking model can balance SLA violation rate (e.g., display the advertisements before corresponding deadlines) and revenue loss (e.g., display the advertisements no more than required).

As set forth herein, advertisements can be prefetched for mobile advertising. According to various embodiments, a prediction model for estimating a number of advertisements that a mobile client is likely to request during an upcoming prediction time period can be employed. An estimated total amount of time of likely interaction with application(s) executed by the mobile client can be predicted; based upon such prediction, a number of advertisement slots likely to be available and a probability of each of the advertisement slots being available can be computed. Moreover, an ad server can allocate advertisements in a pending advertisement queue and/or disparate advertisements collected from an ad exchange to the mobile client based upon the number of advertisement slots likely to be available and the probability of each of the advertisements slots being available, as well as aggregated probabilities of the pending advertisements in the pending advertisement queue being displayed prior to corresponding deadlines for expiration.

Referring now to the drawings, FIG. 1 illustrates a system 100 that delivers prefetched advertisements to a mobile client 102. The system 100 includes an ad server 104, an ad exchange 106, a plurality of ad networks (e.g., an ad network 108 and an ad network 110, collectively referred to herein as ad networks 108-110), and a plurality of advertisers (e.g., an advertiser 112 and an advertiser 114, collectively referred to herein as advertisers 112-114). While FIG. 1 depicts two ad networks 108-110 and two advertisers 112-114, it is to be appreciated that substantially any number of ad networks 108-110 and/or advertisers 112-114 can be included in the system 100.

Examples of the mobile client 102 include a smartphone, a tablet computer, a laptop computer, a portable gaming device, a global positioning system (GPS) device, or the like. The mobile client 102 can execute one or more applications 116. Further, the mobile client 102 can include an ad component 118. According to an example, the ad component 118 can be included in the applications 116 (e.g., a module embedded in the applications 116 that interacts with the ad server 104); however, the claimed subject matter is not so limited.

The mobile client 102 can also include an advertisement cache 120. The advertisement cache 120 can include an advertisement 1, . . . , and an advertisement Z, where Z can be substantially any integer. The advertisements included in the advertisement cache 120 are prefetched advertisements that can be locally served by the ad component 118 during execution of one or more of the applications 116 for display on a display screen (not shown) of the mobile client 102. The ad component 118 can prefetch a batch of advertisements from the ad exchange 106 through the ad server 104, which can be retained in the advertisement cache 120. Moreover, after the prefetched advertisements retained in the advertisement cache 120 are displayed, the ad component 118 can again contact the ad server 104 to obtain a next batch of advertisements, and so forth.

The ad component 118 can notify the ad server 104 with a prefetch request. The ad server 104 can decide to monetize advertisement slots associated with the prefetch request by requesting advertisements from the ad exchange 106. Thus, the ad server 104 can collect advertisements from the ad exchange 106. The ad exchange 106 is a neutral party that aggregates advertisements from different third-party ad networks 108-110 and holds an auction for advertisement slots of mobile clients that are available or will become available during an upcoming prediction time period. The ad networks 108-110 participate in the exchange by estimating expected revenue from showing advertisements in the advertisement slots and placing bids on behalf of their customers (e.g., the advertisers 112-114).

The ad networks 108-110 attempt to maximize revenue by selecting advertisements that are most appropriate, given the context of the user, to maximize a possibility of a user clicking on the advertisements. The ad networks 108-110 receive information about the user such as profile, context, device type, etc. from the ad server 104 through the ad exchange 106. The ad exchange 106 runs the auction and chooses the winner with a highest bid.

The advertisers 112-114 can register with the ad networks 108-110 by submitting an ad campaign. An ad campaign commonly specifies an advertising budget and a target number of impressions/clicks within a certain deadline (e.g., 50,000 impressions delivered in two weeks). The ad campaign can also specify a maximum cap on how many times a single mobile client can see a specific advertisement and how to distribute advertisements over time (e.g., 150 impressions per hour).

The ad server 104 can track which ads are displayed and clicked, and thus, can determine how much money an advertiser 112-114 owes. Revenue of an advertisement slot can be measured in various manners such as by views (e.g., cost per impression) or click-through (e.g., cost per click). The ad server 104 can receive a premium on a sale of each advertisement slot, part of which can be passed to a developer of an application (e.g., the applications 116) where the advertisement is displayed.

Prefetching of advertisements in the system 100 can differ from prefetching in other contexts such as web browsing and web search, since advertisements have deadlines and there are penalties if the advertisements are prefetched but not served within the corresponding deadlines. A deadline D of an advertisement may come from multiple sources. The advertisers 112-114 typically desire the advertisements in ad campaigns be served within corresponding deadlines. For example, one of the advertisers 112-114 may start a campaign for an upcoming sale and the associated advertisements are to be delivered before the sale ends. Even when such advertiser puts a long deadline in place, the ad network (e.g., one of the ad networks 108-110 associated with the advertiser) can set a service level agreement (SLA) that manages a rate at which advertisements are served. For example, the advertiser may start a one-week ad campaign but can desire that 100 impressions of its advertisements be served per hour. In conventional advertisement systems, the foregoing factors can affect ad deadlines of advertisements since advertisements are typically delivered to mobile clients within a short period of time (e.g., a few hundred milliseconds) after being retrieved from the ad exchange 106.

With prefetching of advertisements, however, other factors can contribute to determining a deadline of an advertisement. Suppose the ad server 104 serves advertisements within a serving period that is smaller than the ad deadline specified by the advertisers 112-114. Since the bid price for the advertisements can change over time, the ad server 104 can take some risk in prefetching advertisements. A type of risk is that the bid price for an advertisement may change within the serving period, and if the price increases, the ad server 104 could have made more revenue by collecting the advertisement from the ad exchange 106 at a later point in time rather than at the beginning of the serving period. Another type of risk is that one or more prefetched advertisements may not be served within the deadlines of the advertisers 112-114.

While auction prices in the ad exchange 106 can be dynamic, the dynamics and hence the revenue risks of the ad server 104 can be relatively small for a small window of time. Thus, the ad server 104 can choose a suitable value of a serving deadline depending on the dynamics. According to an example, the serving deadline can be 30 minutes; however, the claimed subject matter is not so limited. With prefetching, a deadline of an advertisement can be a minimum of the deadline specified by the advertisers 112-114 and the serving deadline that the ad server 104 uses for prefetched advertisements. Deadlines specified by the advertisers 112-114 are typically longer than the serving deadline, yet the claimed subject matter is not so limited.

Prefetching of advertisements within the system 100 can be associated with a tradeoff between SLA violations and revenue loss. SLA violations may occur if the ad server 104 fails to deliver a prefetched advertisement within its deadline (e.g., an advertisement for a promotion is displayed after the promotion ends or an advertisement is displayed when its bid price is significantly different from when it was prefetched). Moreover, revenue earned by the ad server 104 is related to a number of unique advertisements served to mobile clients (e.g., the mobile client 102 and disparate mobile clients). An ad prefetching and serving scheme can cause revenue loss to the ad server 104, for instance, by serving advertisements after deadlines, by serving the same ad impression to more users than required, by not serving an advertisement when a slot is available, and so forth.

An aggressive strategy may prefetch more advertisements than can be served to mobile clients within deadlines for the advertisements. This can minimize communication overhead while causing frequent SLA violations. Alternatively, a conservative prefetching approach may mitigate SLA violations by prefetching a small number of advertisements, yet such approach can incur large communication overhead. Moreover, the ad server 104 can replicate advertisements to reduce SLA violations. Thus, the ad server 104 can send the same ad impression to multiple mobile clients to enhance a probability that the ad impression will be served to at least one of such mobile clients; however, this may lead to revenue loss. Accordingly, a prefetching strategy implemented by the system 100 can balance the foregoing competing factors.

More particularly, the system 100 can implement various mechanisms to balance tradeoffs associated with advertisement prefetching. In particular, a number of advertisements that the mobile client 102 will likely be able to show during an upcoming prediction time period T can be estimated. Further, the ad server 104 can utilize the estimated number of advertisements when allocating advertisements to the mobile client 102. Moreover, the ad server 104 may replicate (e.g., overbook) an advertisement across multiple mobile clients (e.g., to account for inaccuracies associated with application usage predictions) to mitigate SLA violations.

Figure 2:
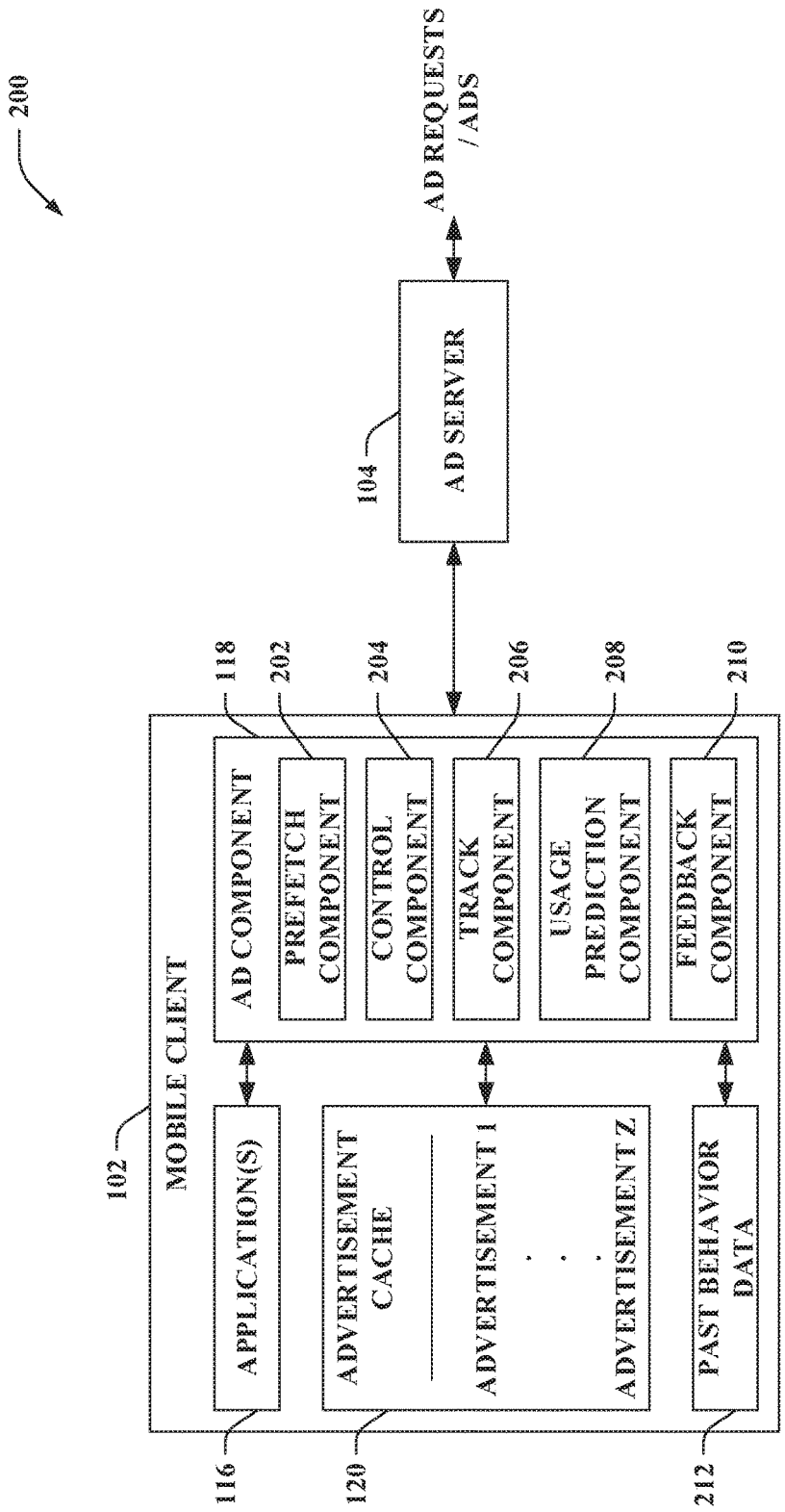
FIG. 2 illustrates a functional block diagram of an exemplary system that predicts a number of advertisements for a mobile client to prefetch and a frequency of such prefetching of the advertisements by the mobile client.

Turning to FIG. 2, illustrated is a system 200 that predicts a number of advertisements for a mobile client 102 to prefetch and a frequency of such prefetching of the advertisements by the mobile client 102. As illustrated, the system 200 includes the mobile client 102 and the ad server 104. While not shown, it is contemplated that the system 200 can further include the ad exchange 106, the ad networks 108-110, and the advertisers 112-114. In the embodiment depicted in FIG. 2, application usage can be predicted by the mobile client 102.

The mobile client 102 includes the applications 116, the ad component 118, and the advertisement cache 120. The ad component 118 further includes a prefetch component 202 that sends a prefetch request to the ad server 104. Responsive to the prefetch request, the prefetch component 202 can receive prefetched advertisements, which can be retained in the advertisement cache 120. Moreover, the prefetch component 202 can receive information that controls which of the prefetched advertisements is to be displayed during each advertisement slot from the ad server 104 (e.g., received with the prefetched advertisements).

The ad component 118 further includes a control component 204 that controls locally serving the advertisements from the advertisement cache 120 during execution of the applications 116 on the mobile client 102. For example, the control component 204 can select the prefetched advertisement from the advertisement cache 120 to be served for a given advertisement slot (e.g., based upon the information received from the ad server 104).

Moreover, the ad component 118 includes a track component 206 that monitors status information pertaining to the prefetched advertisements retained in the advertisement cache 120 of the mobile client 102. The track component 206 can monitor a number of prefetched advertisements from the advertisement cache 120 that have been displayed on the display screen of the mobile client 102, a number of prefetched advertisements in the advertisement cache 120 that have yet to be displayed, etc. The track component 206, for instance, can determine when a number of prefetched advertisements retained in the advertisement cache 120 decreases below a threshold number.

The ad component 118 further includes a usage prediction component 208 that can predict usage of one or more of the applications 116 during an upcoming prediction time period based upon past behavior data 212 for the mobile client 102. The past behavior data 212 can be retained by the mobile client 102 (e.g., in a data repository of the mobile client 102 (not shown)). The usage prediction component 208 can receive the past behavior data 212 for the mobile client 102 (e.g., retrieve the past behavior data 212 from the data repository). Moreover, the usage prediction component 208 can predict an estimated total amount of time of likely interaction with the one or more applications 116 executed by the mobile client 102 during an upcoming prediction time period based upon features from the past behavior data 212 for the mobile client 102. The features from the past behavior data 212 for the mobile client 102 can include a time of day during which a particular application (e.g., one of the applications 116) was executed using the mobile client 102, a day of a week during which the particular application was executed using the mobile client 102, a length of time that the particular application was executed using the mobile client 102, a geographic location of the mobile client 102 at which the particular application was executed using the mobile client 102, a type of the particular application, a combination thereof, etc. The past behavior data 212 can be for a previous duration of time (e.g., behavior data for a past week, past month, past year, etc.) or can include behavior data from any previous time. In addition to using the past behavior data 212, it is contemplated that the usage prediction component 208 can predict the estimated total amount of time of likely interaction with the one or more applications 116 based on other information such as context of a user of the mobile client 102, correlation of usage patterns of various applications, etc.

The usage prediction component 208 can further compute a number of advertisement slots likely to be available during the upcoming prediction time period based upon the estimated total amount of time of likely interaction with the one or more applications 116 during the upcoming prediction time period. Further, the usage prediction component 208 can determine a probability of each of the advertisement slots being available during the upcoming prediction time period.

The number of advertisement slots available during the upcoming prediction time period depends on how often a user is likely to use the applications 116 installed on the mobile client 102. The usage prediction component 208 can determine how many advertisements to prefetch and how often to prefetch such advertisements. Suppose each advertisement comes with a deadline of D minutes and one advertisement is displayed every t minutes during usage of the applications 116, where t is also referred to as a size of an advertisement slot and a refresh period of an advertisement. For simplicity, it can be assumed that the mobile client 102 periodically prefetches advertisements once every round of T minutes (e.g., the upcoming prediction time period). Accordingly, the usage prediction component 208 can predict the number of advertisement slots k available during the upcoming prediction time period.

It is contemplated that the usage prediction component 208 can employ substantially any type of statistical predictor to predict the number of advertisement slots likely to be available during the upcoming prediction time period. Examples of statistical predictors that can be utilized by the usage prediction component 208 include sampling, averaging, k-th percentile, and so forth. Sampling, for instance, can return a random value sampled from a probability density function (PDF) of a user in a current hour of the day. Averaging can return the average number of slots in the current hour of the day from past observations. K-th percentile can return the k-th percentile slot count in the current hour of the day from past observations.

The ad component 118 also includes a feedback component 210 that can transmit the number of the advertisement slots likely to be available during the upcoming prediction time period and the probability of each of the advertisement slots being available during the upcoming prediction time period to the ad server 104. It is contemplated that such information can be transmitted with the prefetch request sent by the prefetch component 202; however, the claimed subject matter is not so limited. The prefetched advertisements are assigned to the mobile client 102 for the upcoming prediction time period by the ad server 104 based at least in part upon the number of advertisement slots likely to be available during the upcoming prediction time period and the probability of each of the advertisement slots being available during the upcoming prediction time period.

According to an example, the usage prediction component 208 can periodically invoke the prediction of the estimated total amount of time of the likely interaction with the applications 116 during the upcoming prediction time period, the computation of the number of the advertisement slots likely to be available during the upcoming prediction time period, and the determination of the probability of each of the advertisement slots being available during the upcoming prediction time period. By way of illustration, the prediction can be periodically invoked every 15 minutes, 30 minutes, 60 minutes, etc.; however, substantially any other length of time is intended to fall within the scope of the hereto appended claims. By way of another example, the usage prediction component 208 can invoke the foregoing predictions in response to reduction of a number of the prefetched advertisements retained in the advertisement cache 120 of the mobile client 102 below a threshold number (e.g., as determined by the track component 206). According to an illustration, the prediction can be invoked when the number of prefetched advertisements in the advertisement cache 120 drops below 2, 3, or 4 advertisements; yet, substantially any other threshold is intended to fall within the scope of the hereto appended claims.

As noted above, the track component 206 can monitor the status information pertaining to the prefetched advertisements retained in the advertisement cache 120 of the mobile client 102. Further, the feedback component 210 can opportunistically transmit the status information pertaining to the prefetched advertisements retained in the advertisement cache 120 of the mobile client 102 to the ad server 104 when a radio of the mobile client 102 is active for a disparate transmission. The status information can specify a first subset of the prefetched advertisements retained in the advertisement cache 120 of the mobile client 102 that have been displayed on the display screen of the mobile client 102. Moreover, the status information can specify a second subset of the prefetched advertisements retained in the advertisement cache 120 of the mobile client 102 that are unlikely to be displayed on the display screen of the mobile client 102 prior to corresponding deadlines for expiration. The opportunistic control channel between the mobile client 102 and the ad server 104 can enable opportunistically informing the ad infrastructure about advertisements that have been shown as well as advertisements included in the advertisement cache 120 that are likely to not be shown on the mobile client 102. Thus, the ad server 104 can adjust distribution of prefetched advertisements across mobile clients (e.g., the mobile client 102 and disparate mobile clients) based upon the status information.

The control channel can enable the feedback component 210 to provide the ad server 104 with up-to-date status information pertaining to utilization of the prefetched advertisements retained in the advertisement cache 120 of the mobile client 102. Accordingly, the ad server 104 can have an up-to-date view of the ad distribution of the mobile clients. The control channel can allow the mobile client 102 to inform the ad server 104 about advertisements that have been shown as well as advertisements that are unlikely to be shown within their deadlines. For instance, if the user is going to sleep and likely will not use the mobile client 102 for the next eight hours, then the ad server 104 can be notified. Similarly, if the advertisement cache 120 has grown too quickly to be consumed within the deadlines of the prefetched advertisements, then the ad server 104 can similarly be notified. The ad server 104 can react to these notifications by updating the advertisement cache 120, for instance. By way of example, the advertisements included in the advertisement cache 120 that are expiring soon can be invalidated by the ad server 104, and instead advertisements with longer deadlines can be assigned to the mobile client 102. Moreover, as described in greater detail below, shortly expiring advertisements can possibly be overbooked by the ad server 104.

Rather than operating in real-time (e.g., which can be associated with greater energy consumption), the control channel can opportunistically piggyback notifications on prefetch requests transmitted by the prefetch component 202 or can send notifications when a radio channel is active due to the applications 116 executing on the mobile client 102. Moreover, it is contemplated that the notifications can be sent by the feedback component 210 within a pre-defined timeout (e.g., 15 minutes); yet, the claimed subject matter is not so limited.

According to various embodiments, it is contemplated that the usage prediction component 208 can predict durations of interactions with different types of applications 116. Hence, the ad server 104 can send assigned advertisements to the mobile client 102 that are appropriate for the types of applications 116 likely to be invoked during the upcoming prediction time period. For instance, the advertisements supplied by the ad server 104 can be different if the usage prediction component 208 determines that games are likely to be invoked as opposed to finance applications during the upcoming prediction time period. Hence, if a type of application is known, the ad server 104 can look for advertisements that match such type. For instance, the ad server 104 can maintain several pending advertisement queues, one for each type of application, advertisement, or keyword. Moreover, the applications 116 can be statically associated with a certain number of keywords, where those keywords can be used by the ad server 104 to select a matching advertisement.

Figure 3:
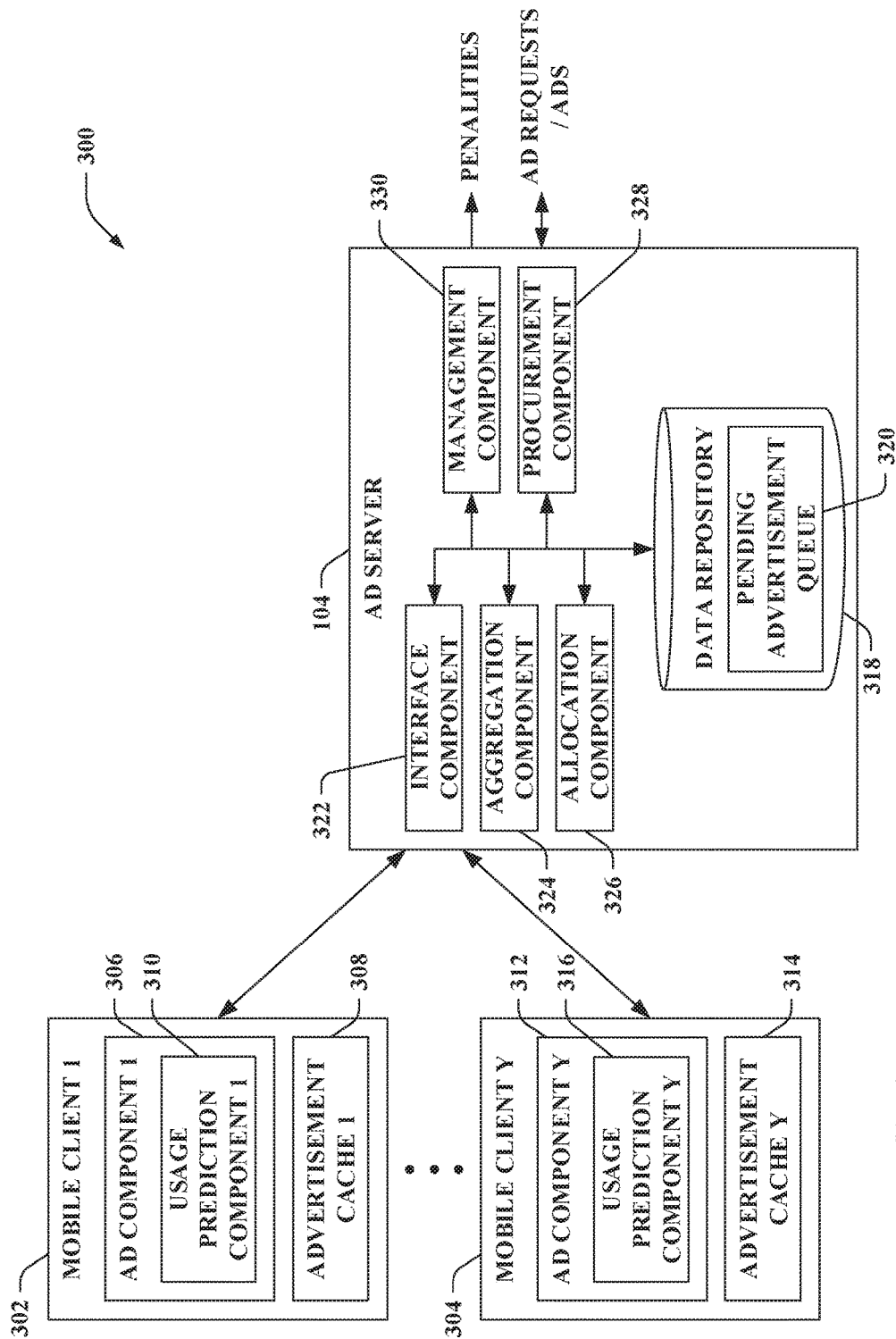
FIG. 3 illustrates a functional block diagram of an exemplary system that distributes prefetched ads to mobile clients.

With reference to FIG. 3, illustrated is a system 300 that distributes prefetched ads to mobile clients. The system 300 includes a mobile client 1 302, . . . , and a mobile client Y 304, where Y can be substantially any integer (collectively referred to herein as mobile clients 302-304), and the ad server 104. The mobile clients 302-304 of FIG. 3 can each be substantially similar to the mobile client 102 of FIG. 1. Moreover, although not shown, it is to be appreciated that the system 300 can further include the ad exchange 106, the ad networks 108-110, and the advertisers 112-114.

The mobile client 1 302 can include an ad component 1 306 and an advertisement cache 1 308, and the ad component 1 306 can further include a usage prediction component 1 310. Similarly, the mobile client Y 304 can include an ad component Y 312 and advertisement cache Y 314, and the ad component Y 312 can further include a usage prediction component Y 316. Although not shown, it is to be appreciated that the mobile clients 302-304 can each include a prefetch component, a control component, a track component, and a feedback component (e.g., similar to the mobile client 102 of FIG. 1).

The ad server 104 allocates advertisements to the mobile clients 302-304. The ad server 104 includes a data repository 318 that retains a pending advertisement queue 320 that includes pending advertisements. The pending advertisements in the pending advertisement queue 320 are collected from the ad exchange. Moreover, the pending advertisements have yet to be displayed by one or more of the mobile clients 302-304. Pending advertisements in the pending advertisement queue 320 each have a corresponding deadline for expiration.

The ad server 104 further includes an interface component 322 that receives a prefetch request from a given mobile client (e.g., one of the mobile clients 302-304) for a certain number of advertisements to be locally served during an upcoming prediction time period for display by the given mobile client during execution of one or more applications. For example, the prefetch request from the given mobile client may be for two or more advertisements; however, it is also contemplated that one advertisement can be requested by the given mobile client via the prefetch request. Moreover, the certain number of advertisements can be the number of advertisement slots that the given mobile client is likely to have during the upcoming prediction time period. It is further contemplated that the prefetch request from the given mobile client can request pending advertisements from the pending advertisement queue 320 or advertisements that are not pending (e.g., the prefetch request can cause the ad server 104 to collect one or more disparate advertisements from the ad exchange).

For simplicity, many of the examples set forth herein describe the interface component 322 receiving a prefetch request from the given mobile client (e.g., the mobile client 1 302); yet, it is contemplated that the interface component 322 can receive a prefetch request from a plurality of the mobile clients 302-304 (e.g., each of the mobile clients 302-304, a subset of the mobile clients 302-304). Moreover, in the embodiment depicted in FIG. 3, the interface component 322 can receive the number of the advertisement slots that the given mobile client is likely to have available during the upcoming production time period and the probability of each of the advertisement slots the given mobile client being available during the upcoming prediction time period from the given mobile client.

The ad server 104 also includes an aggregation component 324 that computes an aggregated probability of each of the pending advertisements in the pending advertisement queue 320 being displayed by at least one of the mobile clients 302-304 prior to the corresponding deadline for expiration. The aggregation component 324, for example, can compute the aggregated probabilities based upon previous allocations of the pending advertisements to the mobile clients 302-304, numbers of available advertisement slots of the mobile clients 302-304, probabilities of the advertisements slots of the mobile clients 302-304 being available, deadlines of the pending advertisements, status information corresponding to previously prefetched advertisements received from the mobile clients 302-304, etc.

Moreover, the ad server 104 includes an allocation component 326 that, in response to the prefetch request received by the interface component 322 from the given mobile client, assigns one or more of the pending advertisements from the pending advertisement queue 320 and/or one or more disparate advertisements collected from the ad exchange to the given mobile client. The allocation component 326 assigns the advertisements to the given mobile client based at least in part upon the aggregated probability of each of the pending advertisements in the pending advertisement queue 320 being displayed prior to the corresponding deadline for expiration, the number of advertisement slots that the given mobile client is likely to have available during the upcoming prediction time period, and the probability of each of the advertisement slots of the given mobile client being available during the upcoming prediction time period. According to the embodiment illustrated in FIG. 3, the number of the advertisement slots that the given mobile client is likely to have available during the upcoming prediction time period and the probability of each of the advertisement slots of the given mobile client being available during the upcoming prediction time period can be received from the given mobile client (e.g., the usage prediction component 1 310 of the mobile client 1 302 can predict the number of advertisement slots that the mobile client 1 302 is likely to have available during the upcoming prediction time period and the probability of each of the advertisement slots of the mobile client 1 302 being available during the upcoming prediction time period). Moreover, the interface component 322 can transmit the subset of the pending advertisements (e.g., assigned to the given mobile client by the allocation component 326) to the given mobile client.

Moreover, the allocation component 326 can generate information that controls which of the assigned advertisements is to be displayed in each of the advertisement slots that the given mobile client is likely to have during the upcoming prediction time period. The interface component 322 can transmit such information to the given mobile client (e.g., along with the assigned advertisements, separate from the transmission of the assigned advertisements).

The interface component 322 can further receive status information from the mobile clients 302-304 via the opportunistic control channel. For instance, the status information received by the interface component 322 can specify a first subset of the pending advertisements that have been prefetched by the mobile clients 302-304 and have been displayed on display screens of the mobile clients 302-304. Further, the status information can specify a second subset of the pending advertisements that have been prefetched by the mobile clients 302-304 and are unlikely to be displayed on the display screens of the mobile clients 302-304 prior to the corresponding deadlines for expiration. The allocation component 326 can adjust assignments of the pending advertisements from the pending advertisement queue 320 to the mobile clients 302-304 based upon the status information.

The ad server 104 further includes a procurement component 328 that can collect the one or more disparate advertisements from the ad exchange (e.g., to add advertisement(s) to the pending advertisement queue 320). The allocation component 326 can cause the procurement component 328 to collect the disparate advertisement(s) from the ad exchange for assignment to the given mobile client. The prefetch request can trigger the allocation component 326 to cause the procurement component 328 to collect the disparate advertisement(s) from the ad exchange if the pending advertisements in the pending advertisement queue 320 are insufficient to satisfy the prefetch request. The foregoing can happen, for example, if the pending advertisement queue 320 lacks enough pending advertisements to satisfy the prefetch request, if the pending advertisements in the pending advertisement queue 320 are expiring too soon, if the pending advertisements are incompatible with a profile of the given mobile client, if the pending advertisements are inappropriate for the application(s) that the given mobile client is likely to invoke, if the prefetch request explicitly requests non-pending advertisements, a combination thereof, etc. Thus, the allocation component 326 can cause the procurement component 328 to send an ad request to the ad exchange for a disparate advertisement. Responsive to receipt of the ad request, the ad exchange can perform an auction for a predicted advertisement slot of the given mobile client (e.g., prior to the advertisement slot being available for display of the disparate advertisement by the given mobile client). The procurement component 328 can further retrieve the disparate advertisement from the ad exchange, and can add the disparate advertisement to the pending advertisement queue 320 (e.g., the disparate advertisement becomes a pending advertisement).

Moreover, the ad server 104 includes a management component 330 that can track pending advertisements from the pending advertisement queue 320 that are displayed by the mobile clients 302-304 and clicked by the mobile clients 302-304. Further, the management component 330 can determine amounts of money owed by advertisers. The management component 330 can transmit information pertaining to the displayed advertisements, clicked advertisements, and/or amounts of owed money to the ad exchange, for example. Moreover, the management component 330 can determine a penalty when pending advertisements in the pending advertisement queue 320 are not displayed by one or more of the mobile clients 302-304 upon expiration of the corresponding deadlines. The management component 330 can transmit an indication of a penalty to the ad exchange when one of the pending advertisements in the pending advertisement queue 320 is not displayed by one or more of the mobile clients 302-304 upon expiration of the corresponding deadline.

The allocation component 326 can employ an overbooking model for determining the number of pending advertisements and which of the pending advertisements each of the mobile clients 302-304 is to prefetch. The allocation component 326 can determine the number of pending advertisements and which of the pending advertisements are to be prefetched based upon predictions regarding application usage and/or advertisement slot availability as well as the status of the advertisements currently prefetched by other clients. The allocation component 326 can determine which advertisements to assign to available advertisement slots of the given mobile clients in order to reduce a number of advertisements that will not be shown within their corresponding deadlines. Moreover, the allocation component 326 can overbook a particular pending advertisement from the pending advertisement queue 320 by assigning the particular pending advertisement to two or more of the mobile clients 302-304. For instance, the particular pending advertisement can be overbooked upon approach of a corresponding deadline for expiration of the particular pending advertisement. Thus, for example, an advertisement which is expiring soon can be more aggressively replicated as compared to an advertisement that has a longer duration of time prior to its deadline. The allocation component 326 can further invalidate a particular pending advertisement that has been prefetched by the given mobile client and has yet to be displayed on the display screen of the given mobile client.

The allocation component 326 can manage a tradeoff between over replication (e.g., overbooking) of advertisements, where a risk associated with an advertisement being unnecessarily shown multiple times increases, and a more conservative approach, where a risk associated an advertisement not being shown within a given deadline increases. Both situations can represent a potential revenue loss for the ad infrastructure. Overbooking (e.g., sending an advertisement to multiple mobile clients 302-304) increases a chance of an advertisement being displayed by at least one of the mobile clients 302-304, and hence, can decrease an SLA violation rate. However, overbooking can entail a risk of displaying the same advertisement in multiple client advertisement slots while only being paid for one impression by the advertiser (e.g., revenue reduction may occur). Accordingly, the allocation component 326 can employ the overbooking model, which can maximize a number of distinct advertisements that can be shown given a certain number of client advertisement slots. Thus, prefetched advertisements that are unlikely to be shown can be aggressively replicated across mobile clients 302-304, whereas prefetched advertisements that are likely to be shown need not be replicated across clients.

The allocation component 326 can employ the following overbooking algorithm. Each time a prefetch request is received from one of the mobile clients 302-304, the overbooking model can attribute a showing probability to each of the pending advertisements in the pending advertisement queue 320 (e.g., the aggregation component 324 can compute the aggregated probability of each of the pending advertisements in the pending advertisement queue 320 being displayed by at least one of the mobile clients prior to the corresponding deadline for expiration). For a given pending advertisement, let S denote the set of advertisement slots (in different mobile clients 302-304) that the pending advertisement has been sent to and let $P(S_i)$ denote a probability of the i-th slot in S being used. Let X be a random variable denoting a number of times the pending advertisement will be displayed. Then, $$P(X \geq 1) = 1 - \Pi_i(1 - P(S_i))$$

$$P(X = 0) = 1 - P(X \geq 1)$$

$$P(X = 1) = P(S_i)\Pi_{i \neq 1}(1 - P(S_i)) + \ldots P(S_n)\Pi_{i \neq n}(1 - P(S_i))$$

$$P(X > 1) = P(X \geq 1) - P(X = 1)$$

P(X=0) is the probability that an SLA miss occurs for the advertisement and
P(X≥1) is the probability that multiple displays will be made.

When a prefetch request is received by the interface component 322 for a batch of advertisements, the ad server 104 can iterate through the set of pending advertisements it has already retrieved from the ad exchange whose display status is unknown, and verify if the penalty for associating the advertisement with a given advertisement slot will increase or decrease. If the penalty decreases, the advertisement can be associated to the advertisement slot that most minimizes its penalty. The penalty function can be defined as:

$$\text{Penalty} = P(X \geq 1) \times O + P(X = 0)$$

The parameter O is an overbooking threshold value that the allocation component 326 uses to tune an aggressiveness of the overbooking model. The smaller the value of O, the more aggressive overbooking is. According to an example, a fixed value of O=1 can be utilized for advertisements; however, it is contemplated that certain types of advertisements can be prioritized over other types of advertisements potentially based on revenue. The above penalty function can be computed by the management component 330 for advertisements that have already been sent to at least one of the mobile clients 302-304, and hence, the set S of slots they are attached to is nonempty.

For an advertisement that is currently not sent to any of the mobile clients 302-304, the following procedure can be utilized to pick an advertisement slot. Each such advertisement can have a lifetime d computed as a difference between its original deadline D and a time elapsed since it was first collected by the procurement component 328. It can be desired to put shortly expiring advertisements in a first few advertisement slots, with higher probability of being used. Thus, the advertisement can be assigned to any of the first d/D×B slots, where B is a batch size predicted. For example, if an advertisement is not attached to any advertisement slot (in any of the mobile clients 302-304) yet, but its lifetime is only one third of its deadline, it can be assigned to any of the first one third slots; however, the claimed subject matter is not limited. The foregoing can provide that the shorter the lifetime, the more aggressively the allocation component 326 places the advertisement on slots with higher showing probabilities.

Figure 4:
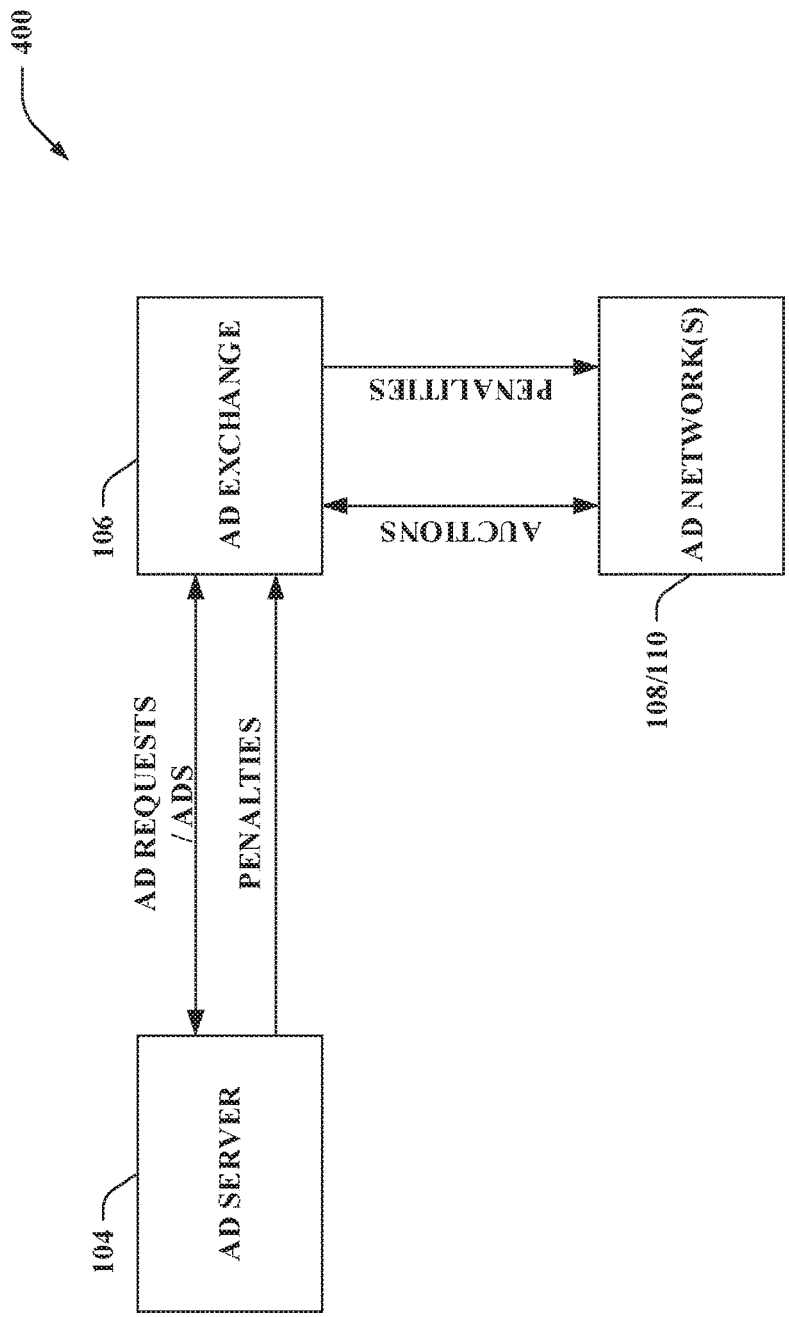
FIG. 4 illustrates a functional block diagram of an exemplary system that exchanges information associated with penalties due to advertisements not being displayed upon expiration of corresponding deadlines.

With reference to FIG. 4, illustrated is a system 400 that exchanges information associated with penalties due to advertisements not being displayed upon expiration of corresponding deadlines. The system 400 includes the ad server 104, the ad exchange 106, and the ad networks 108-110. As described herein, the ad server 104 can request advertisements from the ad exchange 106, the ad exchange 106 can conduct auctions to retrieve the requested advertisements, and the ad server 104 can receive the advertisements from the ad exchange 106. Further, the advertisements each have a corresponding deadline for expiration.

The ad server 104 can also transmit an indication of a penalty (e.g., determined by the management component 330 of FIG. 3) to the ad exchange 106 when one of the advertisements is not displayed by one or more mobile clients upon expiration of the corresponding deadline. Moreover, the ad exchange 106 can communicate the indication of the penalty to the corresponding ad network 108-110.

Figure 5:
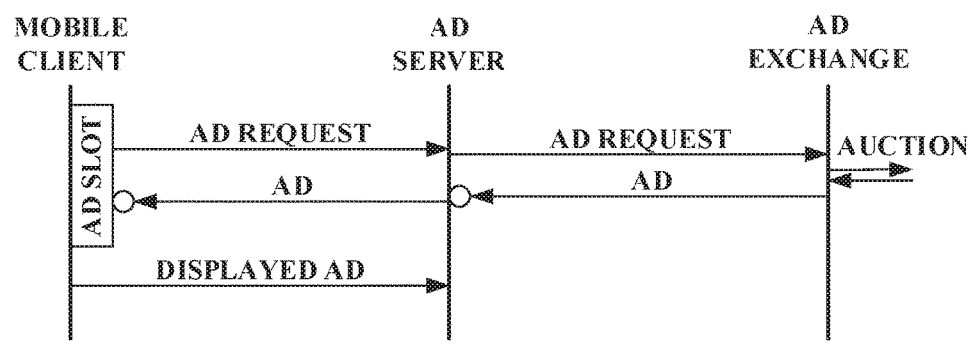
FIG. 5 illustrates an exemplary flow diagram for a conventional advertisement system.

Turning to FIG. 5, illustrated is an exemplary flow diagram 500 for a conventional advertisement system. In the conventional advertisement system, a mobile client can identify an available advertisement slot and, responsive thereto, send an advertisement request to the ad server. The ad server can send the advertisement request to the ad exchange, which can conduct an auction to collect an advertisement. The advertisement can be provided to the ad server which can, thereafter, provide the advertisement to the mobile client for display during the available advertisement slot. Moreover, the mobile client can indicate that the advertisement has been displayed to the ad server.

Figure 6:
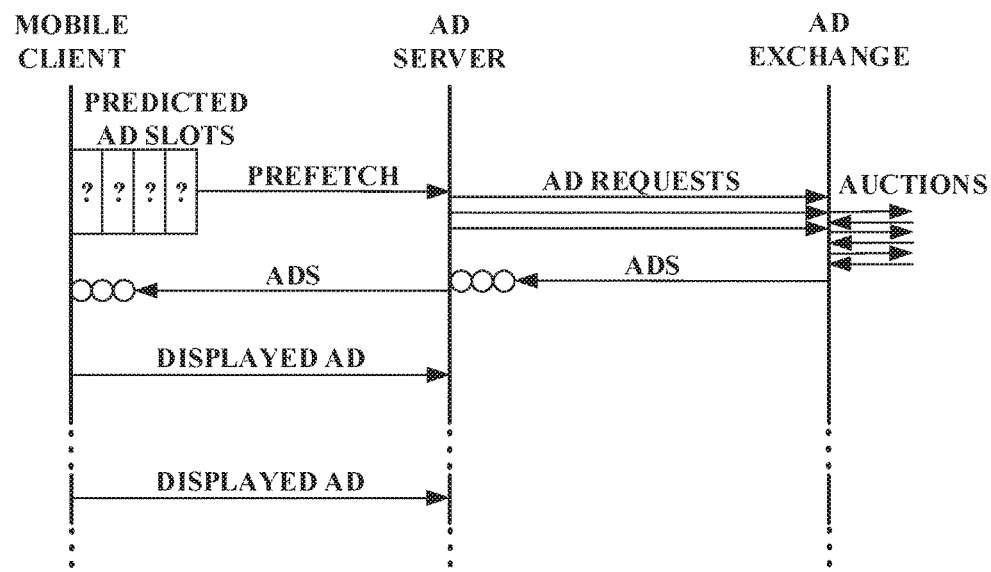
FIGS. 6-7 illustrate exemplary flow diagrams for the advertisement systems described herein that employ prefetching.
Figure 7:
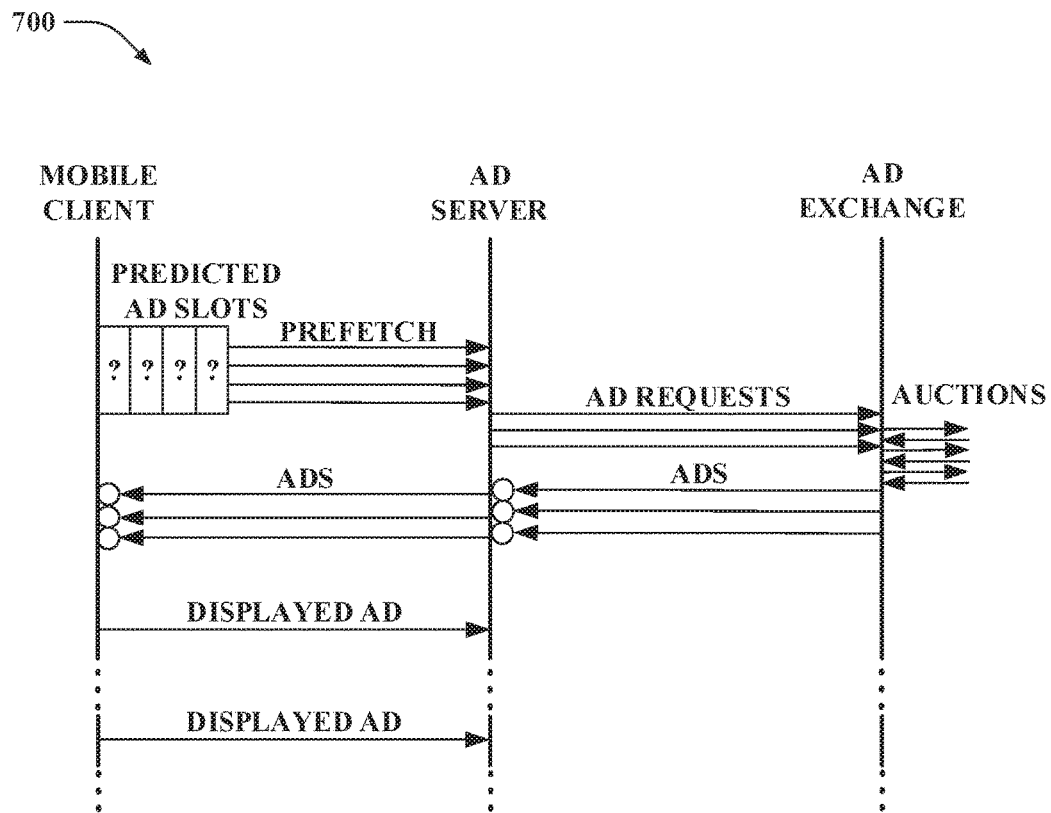

FIGS. 6-7 illustrate exemplary flow diagrams for the advertisement systems described herein that employ prefetching. It is to be appreciated, however, that these flow diagrams are presented for illustration purposes, and the claimed subject matter is not limited to these examples.

With reference to FIG. 6, illustrated is an exemplary flow diagram 600 for an advertisement system that implements prefetching of advertisements for a mobile client. The mobile client can determine predicted advertisement slots. Responsive thereto, the mobile client can send a prefetch request to the ad server. The prefetch request from the mobile client can be for one or more pending advertisements (e.g., two or more pending advertisements). Moreover, the prefetch request depicted in FIG. 6 can be a single bulk request for the one or more pending advertisements. The ad server can, thereafter, send ad requests to the ad exchange for a plurality of advertisements. The ad exchange, responsive to the ad requests, can conduct auctions to collect the advertisements, which can thereafter be provided to the ad server. Moreover, the advertisements can be provided in bulk to the mobile client. Thereafter, as the prefetched advertisements are displayed by the mobile client, the mobile client can indicate to the ad server that such advertisements have been displayed.

Turning to FIG. 7, illustrated is another exemplary flow diagram 700 for an advertisement system that implements prefetching of advertisements for a mobile client. Again, the mobile client can determine the predicted advertisement slots. Further, the mobile client can send a prefetch request to the ad server for two or more pending advertisements. In the example set forth in FIG. 7, the prefetch request can include a plurality of separate requests (e.g., a plurality of ad requests). For instance, each of the separate requests can be for one pending advertisement. However, it is contemplated that at least one of the separate requests can be for more than one pending advertisement. The ad server, in response to receipt of the prefetch request, can send ad requests to the ad exchange. The ad exchange can collect advertisements for the ad server through conducting auctions. The advertisements can then be sent to the ad server, and thereafter sent to the mobile client. The mobile client can pool the advertisements received from the ad server, rather than the advertisements being sent in bulk from the ad server, according to an example. Moreover, as the advertisements are displayed, the mobile client can indicate to the ad server such displaying of the advertisements.

Figure 8:
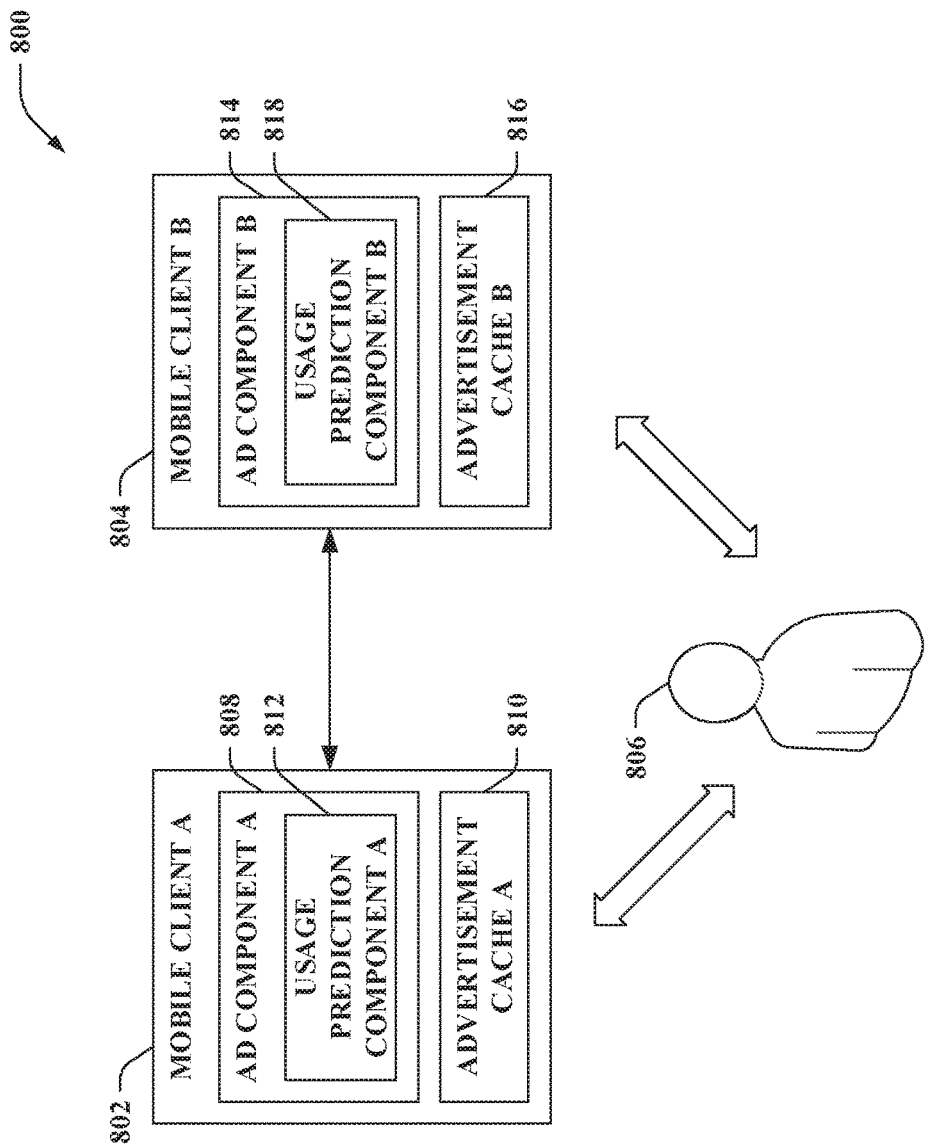
FIG. 8 illustrates a functional block diagram of an exemplary system that predicts application usage in a distributed manner across mobile clients.

Turning to FIG. 8, illustrated is a system 800 that predicts application usage in a distributed manner across mobile clients. The system 800 includes a mobile client A 802 and a mobile client B 804, collectively referred to as mobile clients 802-804. The mobile clients 802-804 can each be substantially similar to the mobile client 102 of FIG. 1. The mobile client A 802 can include an ad component A 808 and an advertisement cache A 810, and the ad component A 808 can include a usage prediction component A 812. Similarly, the mobile client B 804 can include an ad component B 814 and advertisement cache B 816, and the ad component B 814 can include a usage prediction component B 818. Although not shown, it is to be appreciated that the mobile clients 802-804 can each include a prefetch component, a control component, a track component, and a feedback component (e.g., similar to the mobile client 102 of FIG. 1).

The mobile clients 802-804 can both be employed by a given user 806. While the example set forth in FIG. 8 shows two mobile clients being utilized by the given user 806, it is contemplated that more than two mobile clients can be employed by the given user 806. The mobile clients 802-804 can communicate with each other to determine the number of advertisement slots and the probability of each of the advertisement slots being available in a distributed manner across the mobile clients 802-804 of the user 806 (e.g., a smartphone and a tablet can exchange information to predict application usages, etc.). More particularly, the usage prediction component A 812 and the usage prediction component B 818 can exchange information to predict the estimated total amount of time of likely interaction with one or more applications executed by the mobile clients 802-804 during the upcoming prediction time period. Based thereupon, the number of advertisement slots likely to be available during upcoming prediction time period and the probability of each the advertisement slots being available during the upcoming prediction time period can be determined by the usage prediction component A 812 and usage prediction component B 818.

Figure 9:
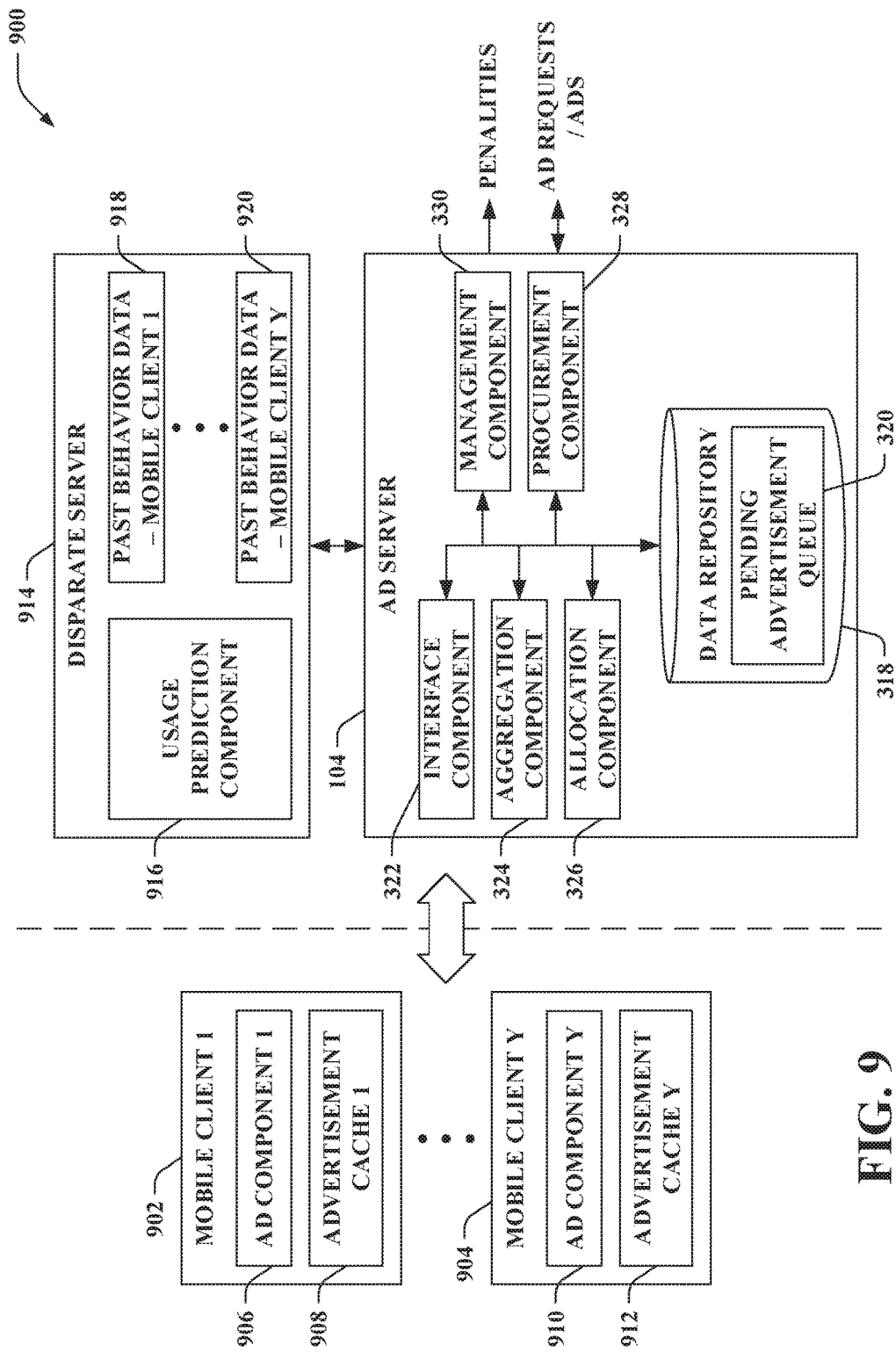
FIG. 9 illustrates a functional block diagram of an exemplary system that employs a server-based application usage prediction model.

With reference to FIG. 9, illustrated is a system 900 that employs a server-based application usage prediction model. The system 900 includes a mobile client 1 902, . . . , and a mobile client Y 904, where Y can be substantially any integer (collectively referred to herein as mobile clients 902-904). The mobile client 1 902 includes an ad component 1 906 and an advertisement cache 1 908. Similarly, the mobile client Y 904 includes an ad component Y 910 and advertisement cache Y 912. The mobile clients 902-904 lack usage prediction components (e.g., the usage prediction component 208 of FIG. 2). Although not shown, it is to be appreciated that the mobile clients 902-904 can each include a control component, a track component, and a feedback component (e.g., similar to the mobile client 102 of FIG. 1). According to various embodiments, the mobile clients 902-904 can each include a prefetch component (e.g., the prefetch component 202 of FIG. 2); yet, according to other embodiments, one or more of the mobile clients 902-904 can lack a prefetch component.

Moreover, the system 900 includes the ad server 104 and a disparate server 914. The disparate server 914 can include a usage prediction component 916 that can be substantially similar to the usage prediction component 208 of FIG. 2. Moreover, the disparate server 914 can retain past behavior data for the mobile clients (e.g., past behavior data 918 for the mobile client 1 902, . . . , and past behavior data 920 for the mobile client Y 904). For each of the mobile clients 902-904, the usage prediction component 916 can predict an estimated total amount of time of likely interaction with one or more applications executed by the corresponding mobile client 902-904 during an upcoming prediction time period based upon features from the corresponding past behavior data 918-920 for the mobile client 902-904. The usage prediction component 916 can further compute the number of advertisement slots likely to be available during the upcoming prediction time period based on the estimated total amount of time of likely interaction with the one or more applications during the upcoming prediction time period and determine a probability of each of the advertisement slots being available during the upcoming prediction time period.

Moreover, the disparate server 914 can transmit the number of the advertisement slots that a given mobile client is likely to have available during the upcoming prediction time period and the probability of each of the advertisement slots of the given mobile clients being available during the upcoming prediction time period to the ad server 104. The interface component 322 of the ad server 104 can receive the number of the advertisement slots and the probability of each of the advertisement slots being available as transmitted from the disparate server 914, which can be utilized as described herein.

Figure 10:
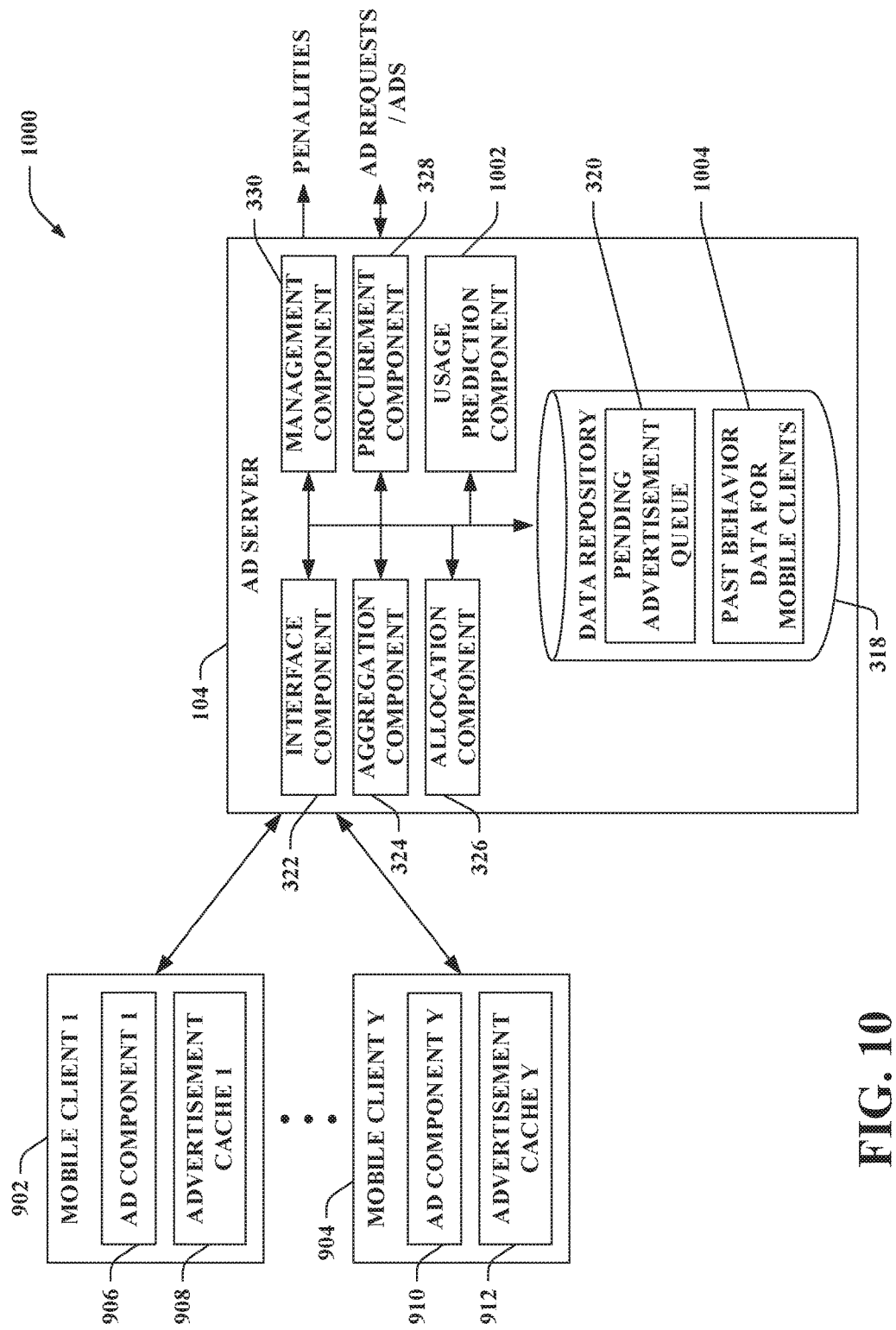
FIG. 10 illustrates a functional block diagram of an exemplary system that employs an ad server-based application usage prediction model.

Turning to FIG. 10, illustrated is a system 1000 that employs an ad server-based application usage prediction model. In the system 1000, the ad server 104 can include a usage prediction component 1002, which can be substantially similar to the usage prediction component 916 of FIG. 9. Moreover, the data repository 318 can include past behavior data 1004 for the mobile clients 902-904 (e.g., the past behavior data 918-920 of FIG. 9). Accordingly, the usage prediction component 1002 can predict the estimated total amount of time of likely interaction with one or more applications executed by a given mobile client during an upcoming prediction time period based upon features from past behavior data for the given mobile client included in the past behavior data 1004 for the mobile clients 902-904. The usage prediction component 1002 can further compute the number of advertisement slots that the given mobile client is likely to have available during the upcoming prediction time period and the probability of each of the advertisement slots of the given mobile client being available during the upcoming prediction time period based upon the estimated total amount of time of likely interaction with the one or more applications during the upcoming prediction time period. Such information can thereafter be utilized by the ad server 104 as described herein.

Reference is now generally made to FIGS. 3, 9, and 10. Although not shown, it is contemplated that a usage prediction component can be distributed across two or more of a mobile client (as shown in FIG. 3), the ad server (as shown in FIG. 10), and a disparate server (as shown in FIG. 9). Moreover, it is to be appreciated that various architectures can be employed to retain the past behavior data 918-920 in the disparate server 914 and/or the past behavior data 1004 for the mobile clients 902-904. For example, separate databases can retain past behavior data for each mobile client. According to another example, the past behavior data for the mobile clients can be retained in a common database. Following this example, past behavior data for each of the mobile clients can be associated with a corresponding identifier and permissions, for instance.

Figure 11:
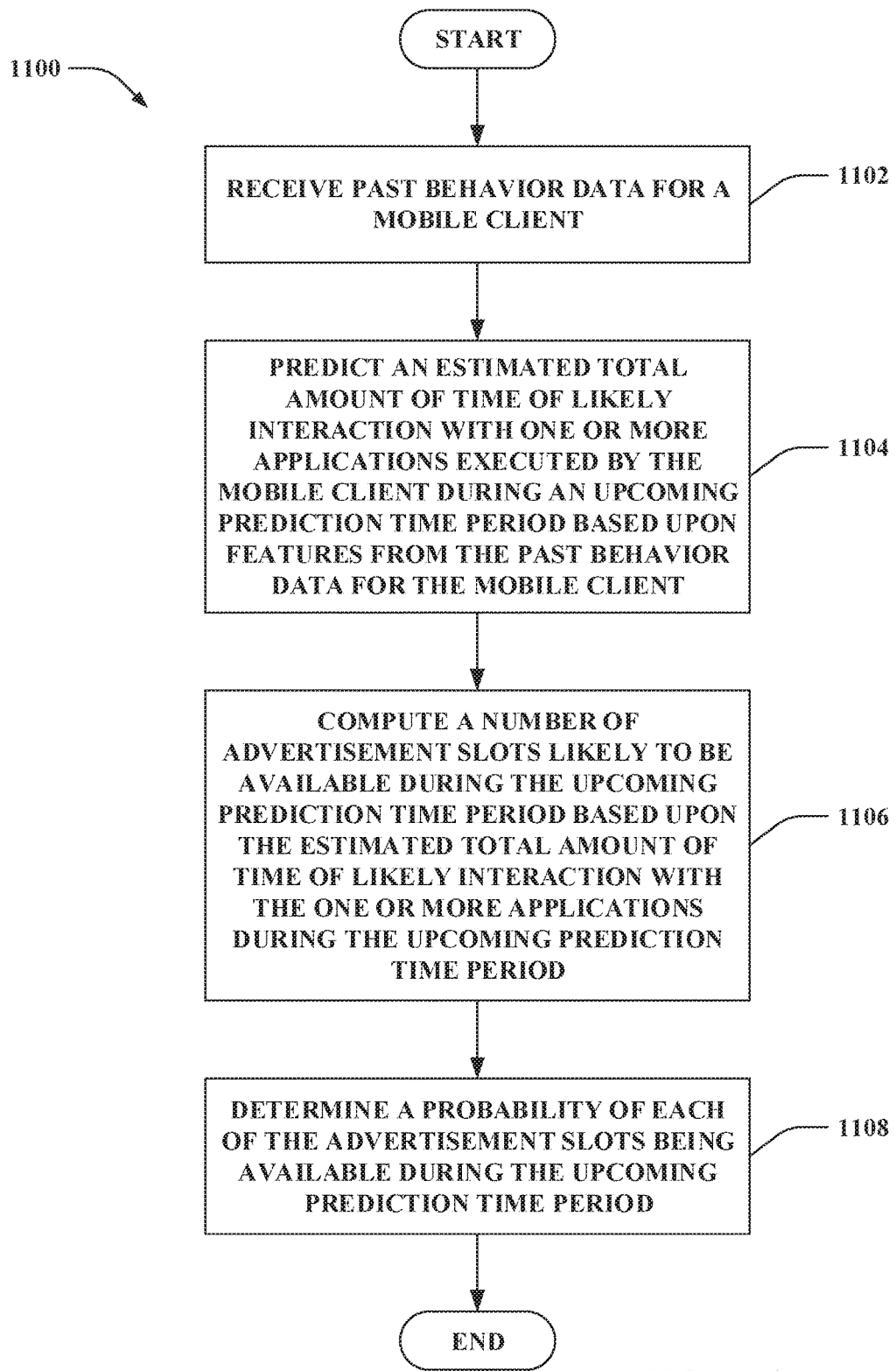
FIG. 11 is a flow diagram that illustrates an exemplary methodology of predicting application usage for a mobile client.
Figure 12:
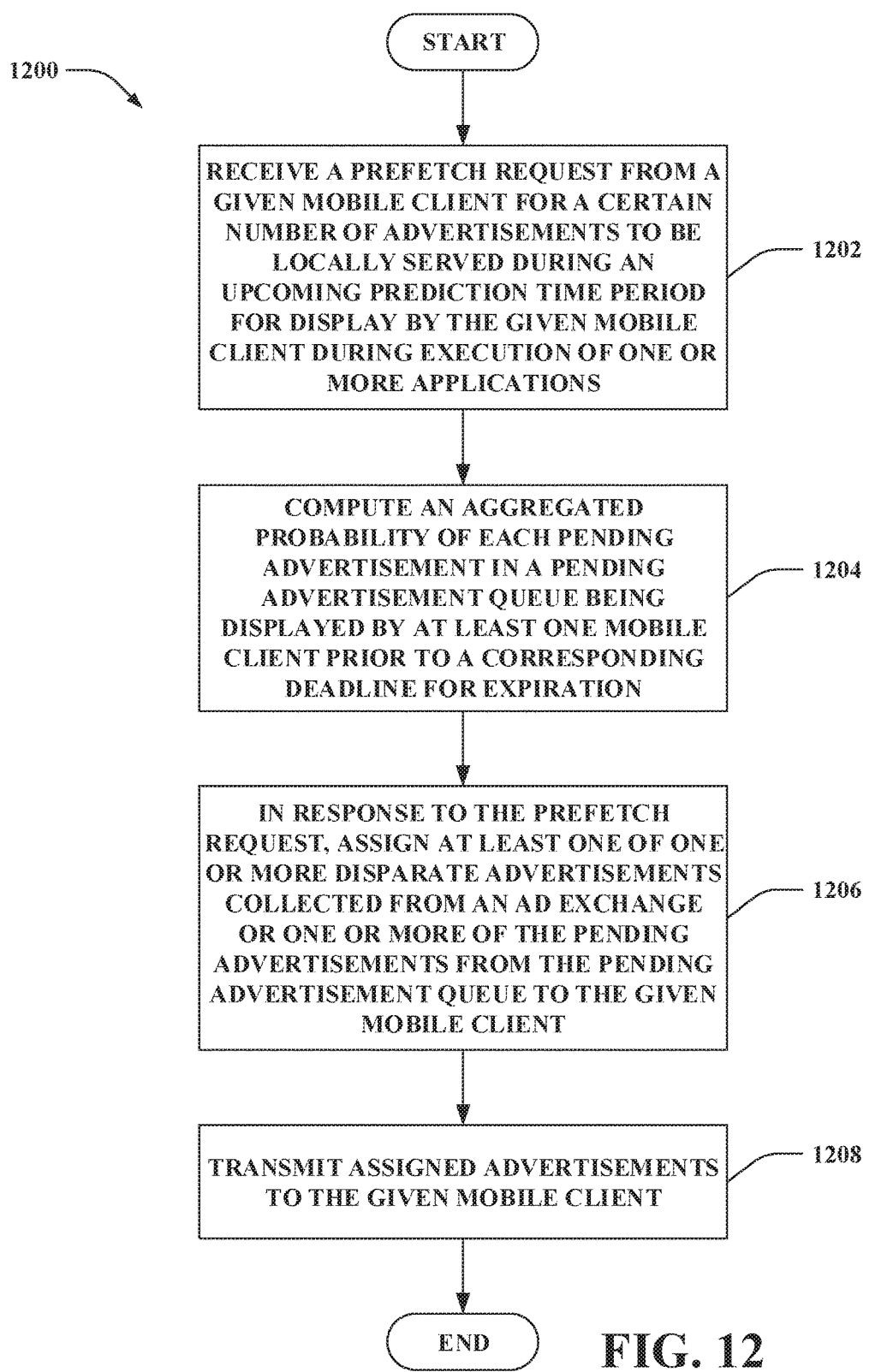
FIG. 12 is a flow diagram that illustrates an exemplary methodology of allocating advertisements to mobile clients.
Figure 13:
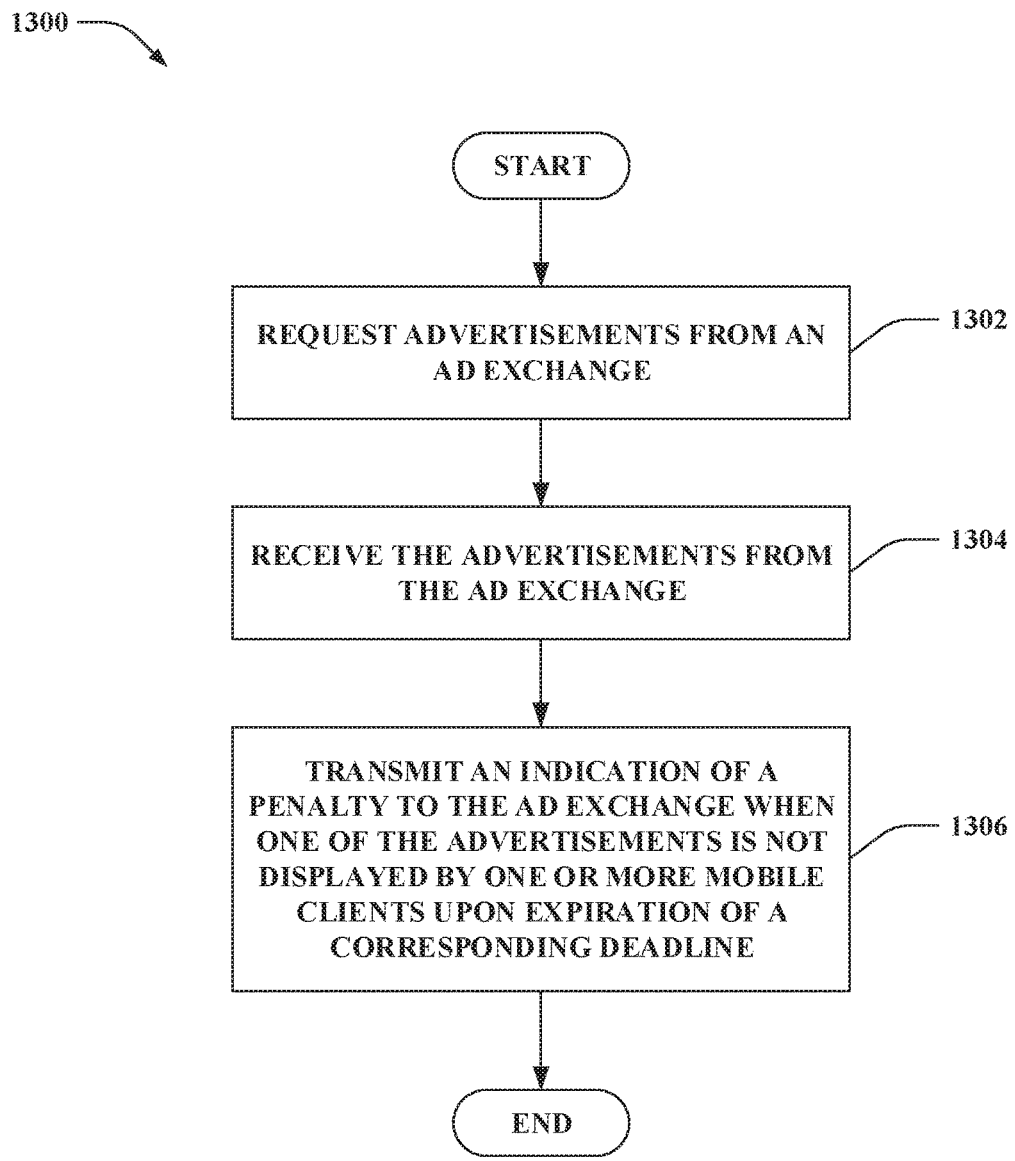
FIG. 13 is a flow diagram that illustrates an exemplary methodology of exchanging information with an ad server.

FIGS. 11-13 illustrate exemplary methodologies relating to prefetching advertisements to be locally served by a mobile client during execution of application(s) by the mobile client. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 11 illustrates a methodology 1100 of predicting application usage for a mobile client. At 1102, past behavior data for the mobile client can be received. At 1104, an estimated total amount of time of likely interaction with one or more applications executed by the mobile client during an upcoming prediction time period can be predicted based upon features from the past behavior data for the mobile client. At 1106, a number of advertisement slots likely to be available during the upcoming prediction time period can be computed based upon the estimated total amount of time of likely interaction with the one or more applications during the upcoming prediction time period. At 1108, a probability of each of the advertisement slots being available during the upcoming prediction time period can be determined.

Now turning to FIG. 12, illustrated is a methodology 1200 of allocating advertisements to mobile clients. At 1202, a prefetch request from a given mobile client for a certain number of advertisements can be received. The prefetch request can be for pending advertisements to be locally served (e.g., by the mobile client) during an upcoming prediction time period for display by the given mobile client during execution of one or more applications. Moreover, the certain number of advertisements can be a number of advertisement slots that the given mobile client is likely to have during the upcoming prediction time period. At 1204, an aggregated probability of each pending advertisement in a pending advertisement queue being displayed by at least one mobile client prior to a corresponding deadline for expiration can be computed. At 1206, in response to the prefetch request, at least one of one or more disparate advertisements collected from an ad exchange or one or more of the pending advertisements from the pending advertisement queue can be assigned to the given mobile client. At 1208, assigned advertisements can be transmitted to the given mobile client.

With reference to FIG. 13, illustrated is a methodology 1300 of exchanging information with an ad server. At 1302, advertisements can be requested from an ad exchange. At 1304, the advertisements can be received from the ad exchange. At 1306, an indication of a penalty can be transmitted to the ad exchange when one of the advertisements is not displayed by one or more mobile clients upon expiration of a corresponding deadline.

Figure 14:
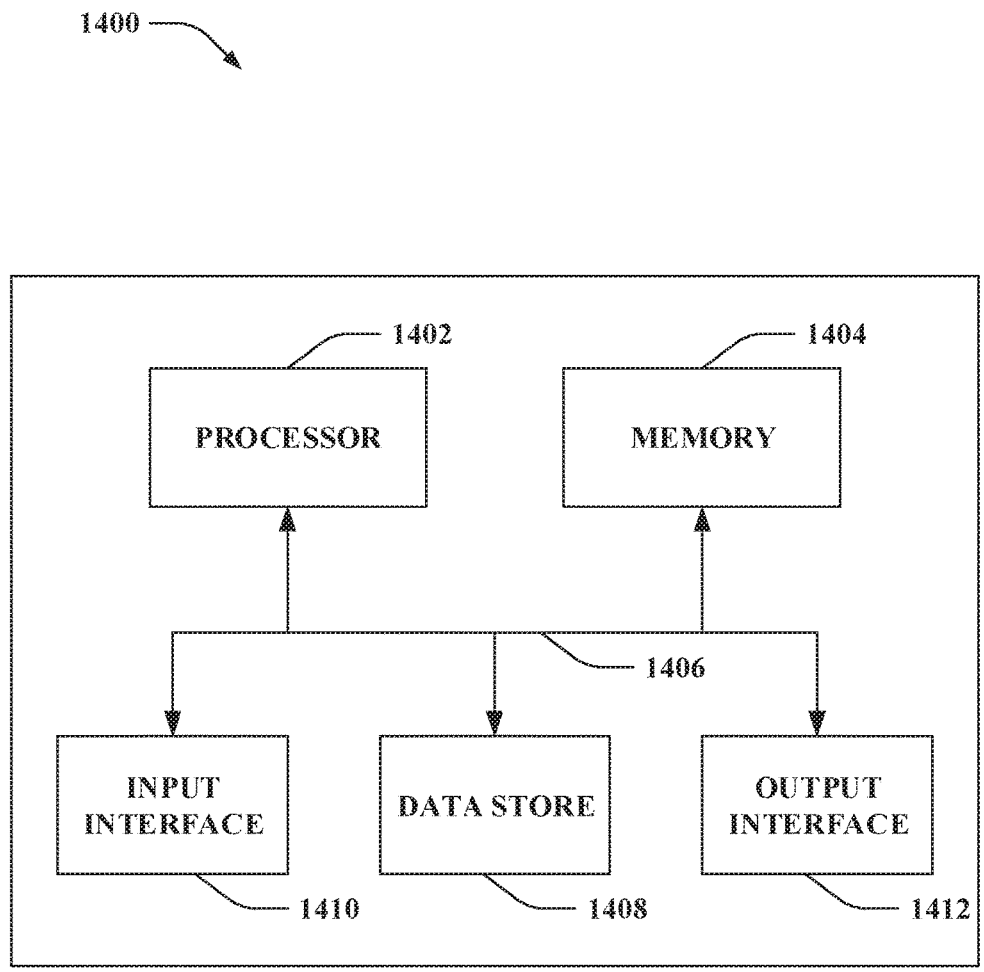
FIG. 14 illustrates an exemplary computing device.

Referring now to FIG. 14, a high-level illustration of an exemplary computing device 1400 that can be used in accordance with the systems and methodologies disclosed herein is illustrated. For instance, the computing device 1400 may be used in a system that estimates a number of advertisements a mobile client is likely to request during an upcoming prediction time period. By way of another example, the computing device 1400 can be used in a system that allocates advertisements to mobile clients for prefetching based upon an overbooking model. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store advertisements, data associated with the advertisements, past behavior data, applications, and so forth.

The computing device 1400 additionally includes a data store 1408 that is accessible by the processor 1402 by way of the system bus 1406. The data store 1408 may include executable instructions, advertisements, data associated with the advertisements, past behavior data, applications, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc. by way of the output interface 1412.

Moreover, the computing device 1400 can transmit data to and/or receive data from disparate computing device(s) (not shown) in a network. For example, the computing device 1400 can include a communications component (not shown) (e.g., a network radio) for wireless transmission and/or reception of data (e.g., on cellular networks, WiFi, etc.). For instance, differing types of networks can be associated with differing tail times (e.g., cellular networks such as 3G networks can be associated with larger tail times as compared to WiFi); however, it is contemplated that the techniques set forth herein can be utilized in substantially any type of network.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a server, comprising:
   requesting content units from an exchange;
   receiving the content units from the exchange, wherein the content units each have a corresponding deadline for expiration;
   assigning the content units to a first client device for an upcoming time period based on data that indicates probabilities of slots for the content units being available during the upcoming time period;
   transmitting the content units to the first client device; and
   transmitting an indication of a penalty to the exchange if one of the content units is not displayed by one or more client devices upon expiration of the corresponding deadline.

2. The method of claim 1, further comprising:
receiving a prefetch request from the first client device, wherein the content units are requested from the exchange responsive to receipt of the prefetch request;
receiving status information pertaining to display of the content units by the first client device; and
transmitting at least one of the content units to a second client device based on the status information;
wherein the one or more client devices comprise the first client device and the second client device.

3. The method of claim 2, wherein the status information specifies a subset of the content units transmitted to the first client device that have been displayed on a display screen of the first client device.

4. The method of claim 2, wherein the status information specifies a subset of the content units transmitted to the first client device that are unlikely to be displayed on a display screen of the first client device prior to the corresponding deadlines for expiration.

5. The method of claim 2, further comprising:
receiving a second prefetch request from the second client device;
wherein the at least one of the content units is transmitted to the second client device responsive to receipt of the second prefetch request.

6. The method of claim 2, wherein the prefetch request from the first client device is for a certain number of content units to be locally served during an upcoming time period for display by the first client device during execution of one or more applications.

7. The method of claim 2, wherein the prefetch request from the first client device comprises the data that indicates the probabilities of the slots for content units being available during the upcoming time period, the probabilities of the slots being available being based on likely interaction with one or more applications executed by the first client device during the upcoming time period.

8. The method of claim 1, further comprising:
computing aggregated probabilities of the content units being displayed by the one or more client devices prior to the corresponding deadlines for expiration;
assigning the content units to the one or more client devices further based on the aggregated probabilities of the content units being displayed by the one or more client devices prior to the corresponding deadlines for expiration; and
transmitting the content units to the one or more client devices as assigned.

9. The method of claim 8, assigning the content units to the one or more client devices further comprises:
assigning a particular content unit to two or more of the client devices upon approach of a corresponding deadline for expiration of the particular content unit.

10. The method of claim 8, assigning the content units to the one or more client devices further comprises:
assigning a particular content unit to the one or more of the client devices further based on a penalty function.

11. The method of claim 8, wherein the content units are assigned to the one or more client devices further based on numbers of content unit slots that the one or more client devices are likely to have available during an upcoming time period.

12. The method of claim 8, wherein the content units are further assigned to the one or more client devices further based on probabilities of content unit slots of the one or more client devices being available during an upcoming time period.

13. A system that allocates content units to one or more client devices, comprising:
a data repository that retains a pending queue, the pending queue comprises pending content units that have been collected from a differing system and have yet to be displayed by the one or more client devices, and wherein the pending content units in the pending queue each have a corresponding deadline for expiration;
at least one processor; and
memory that comprises computer-executable instructions that, when executed by the at least one processor, cause the at least one processor to perform acts including:
requesting content units from the differing system;
receiving the content units from the differing system;
storing the content units in the pending queue as part of the pending content units;
assigning the pending content units to a first client device for an upcoming time period based on data that indicates probabilities of slots for the pending content units being available during the upcoming time period;
transmitting the pending content units to the first client device; and
transmitting an indication of a penalty to the differing system if one of the pending content units is not displayed by the one or more client devices upon expiration of the corresponding deadline.

14. The system of claim 13, the memory further comprising computer-executable instructions that, when executed by the at least one processor, cause the at least one processor to perform acts including:
receiving a prefetch request from a particular client device, wherein the content units are requested from the differing system responsive to receipt of the prefetch request; and
transmitting the pending content units to the particular client device.

15. The system of claim 13, the memory further comprising computer-executable instructions that, when executed by the at least one processor, cause the at least one processor to perform acts including:
receiving status information pertaining to display of the pending content units by the one or more client devices.

16. The system of claim 15, the status information specifies a subset of the pending content units that are unlikely to be displayed on display screens of the one or more client devices prior to the corresponding deadlines for expiration.

17. The system of claim 13, the memory further comprising computer-executable instructions that, when executed by the at least one processor, cause the at least one processor to perform acts including:
computing aggregated probabilities of the pending content units being displayed by the one or more client devices prior to the corresponding deadlines for expiration;
further assigning the pending content units to the one or more client devices based on the aggregated probabilities of the pending content units being displayed by the one or more client devices prior to the corresponding deadlines for expiration; and
transmitting the pending content units to the one or more client devices as assigned.

18. The system of claim 17, wherein a particular pending content unit is assigned to two or more of the client devices upon approach of a corresponding deadline for expiration of the particular pending content unit.

19. The system of claim 17, wherein a particular pending content unit is further assigned to the one or more client devices based on a penalty function.

20. A server, comprising:
- at least one processor; and
- memory that comprises computer-executable instructions that, when executed by the at least one processor, cause the at least one processor to perform acts including:
  - requesting content units from an exchange;
  - receiving the content units from the exchange, wherein the content units each 1a have a corresponding deadline for expiration;
  - assigning the content units to a first client device for an upcoming time period based on data that indicates probabilities of slots for the pending content units being available during the upcoming time period;
  - transmitting the content units to the first client device; and
  - transmitting an indication of a penalty to the exchange if one of the content units is not displayed by one or more client devices upon expiration of the corresponding deadline.

* * * * *